(12) United States Patent
Morrell et al.

(10) Patent No.: US 12,190,634 B2
(45) Date of Patent: Jan. 7, 2025

(54) MACHINE LEARNING TO DETERMINE FACIAL MEASUREMENTS VIA CAPTURED IMAGES

(71) Applicant: ResMed Pty Ltd, Bella Vista (AU)

(72) Inventors: Leah J. Morrell, Madison, WI (US); Michael C. Hogg, Sydney (AU); Paul A. Dickens, Sydney (AU); Harsh C. Parikh, San Jose, CA (US); Mark W. Potter, Halifax (CA); Matthieu Cormier, Dartmouth (CA); Dyllon T. Moseychuck, Lewis Lake (CA)

(73) Assignees: ResMed Corp, San Diego, CA (US); ResMed Pty Ltd, Bella Vista (AU); Reciprocal Labs Corporation, Madison, WI (US); ResMed Halifax ULC, San Diego, CA (US)

( * ) Notice: Subject to any disclaimer, the term of this patent is extended or adjusted under 35 U.S.C. 154(b) by 427 days.

(21) Appl. No.: 17/486,492

(22) Filed: Sep. 27, 2021

(65) Prior Publication Data
US 2023/0103129 A1  Mar. 30, 2023

(51) Int. Cl.
*G06V 40/16* (2022.01)
*G06N 20/00* (2019.01)
(Continued)

(52) U.S. Cl.
CPC .......... *G06V 40/169* (2022.01); *G06N 20/00* (2019.01); *G06T 7/11* (2017.01); *G06T 7/13* (2017.01);
(Continued)

(58) Field of Classification Search
CPC .. G06V 40/169; G06V 10/242; G06V 40/171; G06V 40/173; G06V 40/19;
(Continued)

(56) References Cited

U.S. PATENT DOCUMENTS 7,221,809 B2 * 5/2007 Geng ................... G06V 10/772
  382/280
7,623,687 B2 * 11/2009 Bronstein ............ G06V 20/653
  345/428

(Continued)

FOREIGN PATENT DOCUMENTS

CN   110717373 A * 1/2020   ......... G06K 9/00268
EP    3882810 A1 * 9/2021   ............... A61B 3/11
(Continued)

OTHER PUBLICATIONS

English translation of CN 110717373 B, Image simulation method, electronic device, and computer-readable storage medium (Year: 2019).*

(Continued)

*Primary Examiner* — Manav Seth
(74) *Attorney, Agent, or Firm* — Patterson + Sheridan, LLP

(57) ABSTRACT

Techniques for automated facial measurement are provided. A set of coordinates for a set of landmarks on a face of a user are extracted by processing an image using a machine learning model. An orientation of the face of the user is determined. It is determined that impedance conditions are not present in the images, and a reference distance on the face of the user is estimated based on the image, where the image depicts the user facing towards the imaging sensor. A nose depth of the user is estimated based on a second image based at least in part on the reference distance, where the second image depicts the user facing at an angle relative to the imaging sensor. A facial mask is selected for the user based on the nose depth.

11 Claims, 14 Drawing Sheets

(51) Int. Cl.
  *G06T 7/11* (2017.01)
  *G06T 7/13* (2017.01)
  *G06V 10/24* (2022.01)
  *G06V 40/19* (2022.01)
(52) U.S. Cl.
  CPC .......... *G06V 10/242* (2022.01); *G06V 40/171* (2022.01); *G06V 40/173* (2022.01); *G06V 40/19* (2022.01)
(58) Field of Classification Search
  CPC ...... G06V 10/70; G06V 10/22; G06V 40/161; G06V 40/60; G06N 20/00; G06N 3/0464; G06N 3/045; G06N 3/02; G06N 3/08; G06N 20/10; G06N 20/20; G06T 7/11; G06T 7/13; G06T 1/00; G06T 1/0007; G06T 1/20; G06T 3/14; G06T 5/60; G06T 5/10; G06T 7/50; G06T 7/97; G06T 7/10; G06T 7/0002; G06T 9/002; G06T 2207/10; G06T 2207/20081; G06T 2207/20084; G06T 2207/30201; G06T 7/55; G06T 7/73; G06T 2207/30196
  See application file for complete search history.

(56) References Cited

U.S. PATENT DOCUMENTS

| | | | | |
|---|---|---|---|---|
| 8,254,637 | B2* | 8/2012 | Abourizk | A61M 16/0622 382/128 |
| 12,053,311 | B2* | 8/2024 | Maiman | A61B 6/107 |
| 2003/0223037 | A1* | 12/2003 | Chernyak | G06T 7/337 351/209 |
| 2008/0060652 | A1* | 3/2008 | Selvarajan | A61M 16/0683 128/206.21 |
| 2015/0123967 | A1* | 5/2015 | Quinn | G06T 7/60 345/419 |
| 2016/0062151 | A1 | 3/2016 | Fonte et al. | |
| 2016/0073719 | A1* | 3/2016 | Barad | A63H 9/00 700/98 |
| 2019/0114467 | A1* | 4/2019 | Liang | G06T 5/77 |
| 2020/0065564 | A1* | 2/2020 | Romdhani | G06V 40/172 |
| 2022/0292883 | A1* | 9/2022 | Ohno | G06V 40/45 |

FOREIGN PATENT DOCUMENTS

| | | | | |
|---|---|---|---|---|
| WO | WO-2014057392 A1 * | 4/2014 | .......... | A61B 5/0826 |
| WO | WO-2015195303 A1 * | 12/2015 | .......... | A62B 23/025 |

OTHER PUBLICATIONS

English translation of EP 3882810 A1, Computer Implemented Methods and Devices for Determining Dimensions and Distances of Head Features (Year: 2021).*

PCT, Notification of Transmittal of The International Search Report and The Written Opinion of The International Searching Authority, or The Declaration for Application PCT/US22/77096 dated Jan. 31, 2023.

* cited by examiner

MACHINE LEARNING TO DETERMINE FACIAL MEASUREMENTS VIA CAPTURED IMAGES

INTRODUCTION

Aspects of the present disclosure relate to computer vision and machine learning. More specifically, aspects of the present disclosure relate to using machine learning to evaluate user images to determine facial measurements for fitment of facial devices.

In a wide variety of medical (and non-medical) settings, accurate facial measurements are needed to drive decisions and selections for the user. For example, in many cases, the particular dimensions of the face of the individual user are needed to help design, construct, and/or select an appropriate mask that will fit the user's face comfortably and completely. As one example, continuous positive airway pressure (CPAP) machines generally use a mask or nosepiece to deliver constant and steady air pressure to users during sleep. However, for the system to operate properly (as well as to improve the user experience and health), it is important that the mask fit properly (e.g., comfortably, and without leaks around the face).

In some conventional systems, users can visit a physical environment (e.g., the office of a healthcare provider or mask distributor) to try on various masks. However, this requires physical presence of the user, which is not always possible due to factors such as location or remoteness of the user and/or provider, ability to travel, available time for the user, and the like. Further, the user is limited to the available (preconfigured) mask sizes and dimensions, and generally must manually try a number of them to find a correct fit, which can present problems when sterility is required.

In some conventional systems, attempts have been made to measure or estimate facial dimensions of the user, in order to drive mask selection or design. For example, some approaches involve the user measuring their own face, such as by using a ruler, a coin or other object with a known size, and the like. However, such approaches have proven to be inaccurate and frustrating to the user leading to poor outcomes. For example, obtaining the wrong mask based on inaccurate measurements may lead to a mask that does not work well for its intended purpose, which can in-turn affect a user's condition, treatment, and outcome.

Additionally, some approaches have attempted to improve on manual measurements by using specialized devices or systems, such as cameras configured to capture three-dimensional data including depth. These specialized devices are complex, expensive, and frequently unavailable. Further, they typically still require the user to physically travel to the location of the device (or require the device to be physically brought to the user), significantly limiting their use.

Improved systems and techniques to determine facial measurements are needed.

SUMMARY

According to one embodiment presented in this disclosure, a method is provided. The method includes: identifying a set of images, from a plurality of images captured by an imaging sensor, that satisfy defined orientation criteria, comprising, for each respective image in the set of images: extracting, by processing the respective image using one or more landmark-detection machine learning models, a respective set of coordinate locations for a set of facial landmarks on a face of a user depicted in the respective image; and determining a respective orientation of the face of the user depicted in the respective image; determining that one or more impedance conditions are not present in the set of images; estimating a reference distance on the face of the user based on a first image of the set of images, wherein the first image depicts the user facing towards the imaging sensor; estimating a nose depth of the user based on a second image of the set of images based at least in part on the reference distance, wherein the second image depicts the user facing at a predefined angle relative to the imaging sensor; and selecting a facial mask for the user based at least in part on the nose depth.

According to a second embodiment of the present disclosure, a computer program product is provided. The computer program product comprises logic encoded in a non-transitory medium, the logic executable by operation of one or more computer processors to perform an operation comprising: identifying a set of images, from a plurality of images captured by an imaging sensor, that satisfy defined orientation criteria, comprising, for each respective image in the set of images: extracting, by processing the respective image using one or more landmark-detection machine learning models, a respective set of coordinate locations for a set of facial landmarks on a face of a user depicted in the respective image; and determining a respective orientation of the face of the user depicted in the respective image; determining that one or more impedance conditions are not present in the set of images; estimating a reference distance on the face of the user based on a first image of the set of images, wherein the first image depicts the user facing towards the imaging sensor; estimating a nose depth of the user based on a second image of the set of images based at least in part on the reference distance, wherein the second image depicts the user facing at a predefined angle relative to the imaging sensor; and selecting a facial mask for the user based at least in part on the nose depth.

According to a third embodiment of the present disclosure, a system is provided. The system comprises one or more computer processors; and logic encoded in a non-transitory medium, the logic executable by operation of the one or more computer processors to perform an operation comprising: identifying a set of images, from a plurality of images captured by an imaging sensor, that satisfy defined orientation criteria, comprising, for each respective image in the set of images: extracting, by processing the respective image using one or more landmark-detection machine learning models, a respective set of coordinate locations for a set of facial landmarks on a face of a user depicted in the respective image; and determining a respective orientation of the face of the user depicted in the respective image; determining that one or more impedance conditions are not present in the set of images; estimating a reference distance on the face of the user based on a first image of the set of images, wherein the first image depicts the user facing towards the imaging sensor; estimating a nose depth of the user based on a second image of the set of images based at least in part on the reference distance, wherein the second image depicts the user facing at a predefined angle relative to the imaging sensor; and selecting a facial mask for the user based at least in part on the nose depth.

According to a fourth embodiment presented in this disclosure, a method is provided. The method includes: receiving a first exemplar image, wherein the first exemplar image depicts a face of a user; defining one or more regions of interest (ROIs) on the face; determining whether the user is wearing glasses in the first exemplar image by processing each of the one or more ROIs using one or more edge detection techniques; labeling the first exemplar image to indicate whether the user is wearing glasses; and refining a machine learning model based on the first exemplar image and label.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
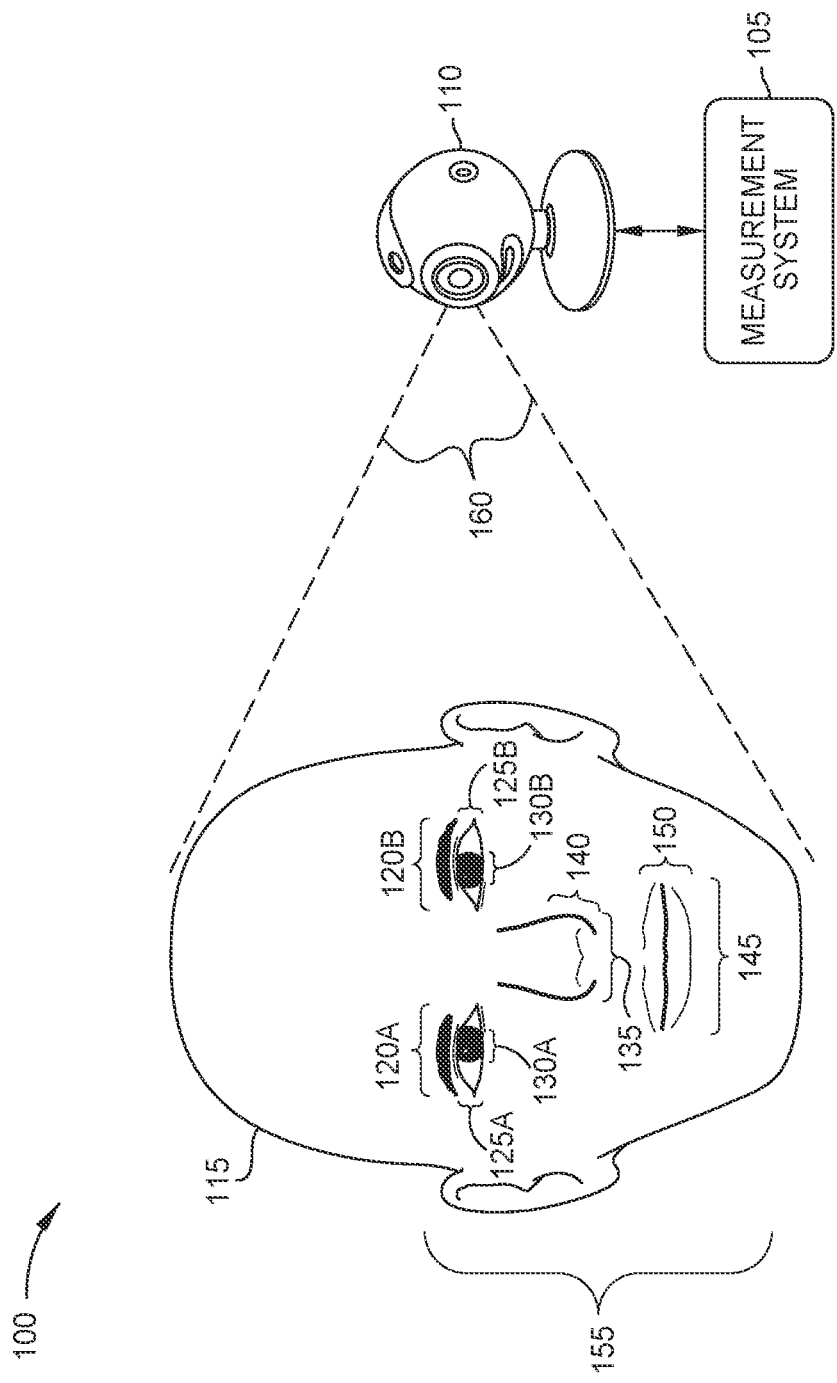
FIG. 1 depicts an example environment to use machine learning to analyze images and determine facial measurements.

Aspects of the present disclosure provide apparatuses, methods, processing systems, and computer-readable mediums for accurate facial dimension measurement using machine learning to evaluate user images.

In some embodiments, a measurement system is provided. The measurement system may be configured to evaluate a set of images (e.g., a video stream) captured from an imaging sensor (such as a webcam) using machine learning to generate accurate biometric measurements. Beneficially, the system can use two-dimensional images to generate measurements that relate to three-dimensional structures, such as human facial features, and need not rely on complex three-dimensional imaging systems. This enables the system to be implemented using a wide range of widely available imaging sensors, including web cameras, mobile device cameras, and the like. Further, by using a number of machine learning models at various points in the workflow, the system is able to derive accurate and reliable estimates from the two-dimensional images.

In some embodiments, the user may directed to move a body part, such as their face, through a range of motion while an imaging sensor captures images of the body part at different angles. Trained machine learning models may then be used to identify and select a set of reference images that can be used to derive accurate measurements of the user's body part (e.g., accurate measurements of a user's nose and/or other facial features). For example, in one embodiment, one or more machine learning models are used to identify facial landmarks of the user, and these landmarks are used to determine the orientation of the user's face. This angle may include a head tilt (left and right, and/or up and down), an angle of the face (e.g., looking towards the left, the right, or straight at the camera), and the like.

In some embodiments, this facial orientation (also referred to as a "pose" in some embodiments) is determined for each of a number of images (e.g., for each frame in a video captured by the user's camera). The system can then select images that meet defined orientation criteria and use these images as reference images to determine accurate facial measurements. In at least one embodiment, the orientation criteria include a facial tilt that does not exceed a defined threshold (e.g., a tilt with a magnitude of less than eight degrees, or within −8 to 8 degrees, relative to the imaging sensor). In some embodiments, the reference images are further selected based on the angle of the user's face relative to the camera. For example, the system may select one image with the user facing directly towards the camera (e.g., at an angle equal to, or within a defined distance from, zero degrees relative to the imaging sensor). The system may also select an image depicting the user's face at a defined angle towards the left and/or the right of the camera (e.g., at an angle equal to, or within a defined distance from, twenty degrees relative to the imaging sensor, such as between −19 and −21 degrees, and between 19 and 21 degrees).

The system may further uses machine learning to identify any potential impedances in the reference images. As used herein, an impedance is any condition that may prevent an image from being used to accurately determine facial measurements. For example, in some embodiments, the system uses one or more facial landmarks (e.g., the width or diameter of the user's iris) to convert relative measurements to absolute sizes. In one such embodiment, an impedance may include the presence of glasses or other occlusions on the user (which may distort or obscure the iris size), the presence of closed eyes of the user (which may prevent accurate measurement of the iris), and the like. Similarly, in some embodiments, an impedance can correspond to the user's expression (e.g., with their mouth being open) or other deviation from a neural expression (such as a smile), which may distort the measured facial height of the user.

In some embodiments, the system can select a number of candidate reference images for each defined orientation, and evaluate each candidate in view of the defined impedances. Such an embodiment may enable the system to rely on an alternative reference image if the initially-selected one includes one or more impedances, reducing the need to re-start the scan process.

In some embodiments, once the reference images are selected and validated, they can be used to estimate, calculate, compute, or otherwise determine a set of facial measurements of the user. In one embodiment, the system determines the face height, nose width, and nose depth of the user. For example, the face height and nose width may be determined based on a forward-facing reference image (e.g., where the user's face is at, or near, an angle of zero degrees). In various embodiments, the particular facial measurements that are determined and used may vary depending on the particular task (e.g., to allow determination of proper sizing for conduits (e.g., for tube-up masks), head gear, nostril sizes for pillow masks, and the like). In some embodiments, the nose depth is determined using one or more angled images (e.g., where the user is facing towards the left or right of the imaging sensor). These measurements can then be used to select, design, customize, or otherwise retrieve a facial device for the user, such as an appropriately-fitted mask for the user, to ensure functionality, comfort, and stability.

In some embodiments of the present disclosure, the machine learning models and measurement system are optimized to execute entirely on a device of the user (e.g., within a browser), which may have relatively limited computing power. For example, in response to a user request, a providing system may transmit the relevant machine learning models, as well as relevant software (e.g., in JavaScript) to cause the user device to execute the operations discussed herein locally.

Further, local execution generally enables the measurements to be determined using reduced computational expense, as compared to conventional systems. Further, because the images may be analyzed locally, they need not be transmitted to other devices. Instead, the local device can determine the relevant measurements, and transmit only these measurements to remote device(s). By refraining from transmitting the image(s) across any networks (e.g., the Internet), the system can significantly reduce latency of the operation, reduce bandwidth consumption and traffic on the network, and secure user privacy.

Example Environment for Facial Measurement Estimation Using Machine Learning

FIG. 1 depicts an example environment 100 to use machine learning to analyze images and determine facial measurements.

In the illustrated example, a measurement system 105 is communicatively coupled with an imaging sensor 110, which is arranged to capture images of the face of a user 115, as indicated by sightlines 160. In some embodiments, the imaging sensor 110 is a webcam or a camera on a smartphone device, laptop device, or the like. Generally, the imaging sensor 110 is configured to capture two-dimensional images and/or videos.

In some embodiments, the measurement system 105 operates on a device of the user 115. For example, the measurement system 105 may be implemented as an application on the user's smartphone, laptop, tablet, or desktop computer. In some embodiments, the measurement system 105 operates within a browser on the user's device. In other embodiments, the measurement system 105 may be implemented in other locations, such as remotely (e.g., in a cloud deployment).

In some embodiments, the facial measurements are determined based on a set of reference images captured by the imaging sensor 110. In one such embodiment, the measurement system 105 can use a machine learning model to identify and extract, for each image in a stream of images (e.g., in a video), coordinate locations of various facial landmarks (such as the top and bottom of the head, center, top, bottom, and edges of the eyes and mouth, and the like). By evaluating these coordinate locations, the measurement system 105 can determine the orientation of the user 115 in the image. The measurement system 105 can then select reference images that meet the defined orientation criteria.

In the illustrated example, a variety of facial (biometric) measurements are determined based on the face of the user 115. These can include, for example, an eye width 120 of one or both eyes, an eye height 125 for one or both eyes, an iris diameter or width of one or both eyes 130, a nose width 135, a nose depth 140, a mouth width 145, a mouth height 150, a facial height 155, and the like. In an embodiment, some (or all) of these measurements may be used to define the facial dimensions and drive mask selection (or other tasks), while others are used to drive the measurement process itself, such as to detect impedances, define the scaling of the values, and the like.

In some aspects, the landmark measurements may not be point-to-point distance measurements between the relevant landmarks. Instead, in at least one embodiment, the landmarks are used to create a coordinate system local to the user's head (e.g., such that the coordinate system moves with the user's head) based on, for example, the Frankfort horizontal plane. To determine the facial measurements, the landmarks may be first projected onto the aces of this coordinate system, and the measurements can be determined based on the distances between these projected points.

In some embodiments, the iris width 130A and/or 130B (also referred to in some embodiments as iris diameter) is used to determine a scale between pixels in the input images and absolute measurements (e.g., distance in millimeters) based on a defined value for the average iris width or diameter. For example, it has been shown that the average iris diameter or width of an adult human is roughly 11.7 millimeters across a wide population (plus or minus some standard deviation, such as 0.5 millimeters). Thus, in some embodiments, the measurement system 105 can determine the iris width 130A and/or 130B, in terms of the number of pixels in the input image, and use the defined absolute iris width (e.g., 11.7 mm) to determine the number of pixels-per-millimeter for the image. This scale factor can then be used to convert pixel measurements to absolute measurements for the image.

In some embodiments, the measurement system 105 can determine this scale factor based on a single eye (e.g., based on the iris width 130A or 130B). In at least one embodiment, however, the measurement system 105 can determine the iris width 130A and 130B individually for each eye, and the average of these two values can be used to determine the scale factor. In some embodiments, the iris width 130A/130B is determined based on a forward-facing image. That is, the measurement system 105 can identify an image where the user 115 is facing directly towards the camera (e.g., within a predefined number of degrees from zero), and use this as the reference image to determine the iris width.

Although iris width or diameter is used as the reference measurement in some examples, in embodiments, a variety of other predefined reference measurements may be used. This may include other landmarks on the face of the user. Additionally, in some embodiments, non-facial reference measurements can be used. For example, in one such embodiment, the user is instructed to hold a known item (e.g., a specific coin, such as a quarter), which can be identified and measured by the system (in a similar manner to measuring the iris) in order to determine the scale factor for each image. Further, in some embodiments, the iris diameter is only used for scaling when the user has reached a defined age (e.g., twenty or twenty-one) as, before this time, the user's eye may not have reached full size. That is, in at least one embodiment, the system does not use iris diameter for users that are below the defined age, and one or more other reference measurements can be used.

In the illustrated embodiment, the measurement system 105 can use the eye width 120 and/or eye height 125 to check for impedances in the reference image(s). In one such embodiment, based on a ratio between the eye height 125 and eye width 120, the measurement system 105 can determine whether the eye(s) of the user are open in the image. For example, if the ratio is below a defined threshold (e.g., if the eyes are significantly wider than they are high), the measurement system 105 can infer that the user's eyes are closed entirely or partially. As this may obscure or prevent accurate iris-width detection, the measurement system 105 treat this as an impedance and refrain from using the reference image.

In a related embodiment, the measurement system 105 can use the mouth width 145 and mouth height 150 to check for impedances. In one such embodiment, based on the ratio between the mouth height 150 and mouth width 145, the measurement system 105 can determine whether the user's mouth is open. For example, if the ratio is below a defined threshold (e.g., if the mouth is significantly wider than it is tall), the measurement system 105 can infer that the mouth is closed. If the ratio exceeds the threshold (e.g., if the mouth height is comparable to the mouth width), the measurement system 105 may infer that the mouth is open. As an open mouth can distort or prevent accurate measurement of the facial height 155, the measurement system 105 may treat this as an impedance and refrain from using the reference image.

In some embodiments, the facial height 155 can be used to determine a relative scale between two or more reference images (if the two images have the same or similar expression and/or pose). For example, the measurement system 105 may determine the facial height 155 of the user 115 in the forward-facing reference image. In an angled reference image (e.g., where the user 115 faces towards the left or right of the imaging sensor 110), the measurement system 105 can determine a second facial height measurement. These two measurements can then be compared to determine the relative scale between the images. For example, if the user shifted closer to or further from the camera between the images, the facial height will appear larger or smaller, respectively, in terms of the number of pixels that it spans. Thus, by using the facial height 155 in each image, the measurement system 105 can determine the relative scale, and adjust the measurements from the angled image appropriately (e.g., by scaling pixel-measurements in the angled image up or down, depending on whether the facial height in the angled image is larger or smaller than the height in the forward image).

In the illustrated example, the nose width 135 and facial height 155 can be determined based on the forward-facing reference image. In at least one embodiment, the facial height 155 is defined based on the distance between the user's sellion (the nose bridge point) and the supramenton (a point just above the bottom of the chin). The nose depth 140, however, may be determined based at least in part on one or more angled images, as discussed in more detail below. For example, based on the known nose width 135 and angle of the user in the angled image, as well as the perceived distance between the tip of the nose and one or more other features of the face (such as the alar-facial groove of the user), the measurement system 105 can compute the nose depth 140.

In an embodiment, the relevant facial measurements (e.g., the facial height 155, nose width 135, and nose depth 140) can be used to drive mask selection or customization. In at least one embodiment, these measurements (along with relevant identifying information such as the name or other identifier for the user 115) can be transmitted, from the measurement system 105, to a remote system. For example, the measurement system 105 may transmit these measurements to a computing system hosted by a healthcare provider. The healthcare provider can then use the measurements to select or design the mask. In some embodiments, the available masks may each be associated with a given set of preferred measurements. That is, each respective mask may be associated with a respective range of facial heights, nose widths, and/or nose depths for which the mask was designed or works well. In one such embodiment, based on the measurements for the specific user 115, the healthcare provider can easily and automatically select a mask that will best fit the user's actual face.

Advantageously, the user 115 can use conventional imaging sensors 110 (e.g., a camera on their smartphone or laptop) to compute these measurements, and no special equipment is needed. Further, the user need not manually capture any measurements, and need not travel or otherwise physically visit the healthcare provider. Additionally, because the measurement system 105 can operate locally within the user's device, user privacy is maintained and network traffic is reduced (e.g., because the images are not transmitted to the remote servers).

Figure 2:
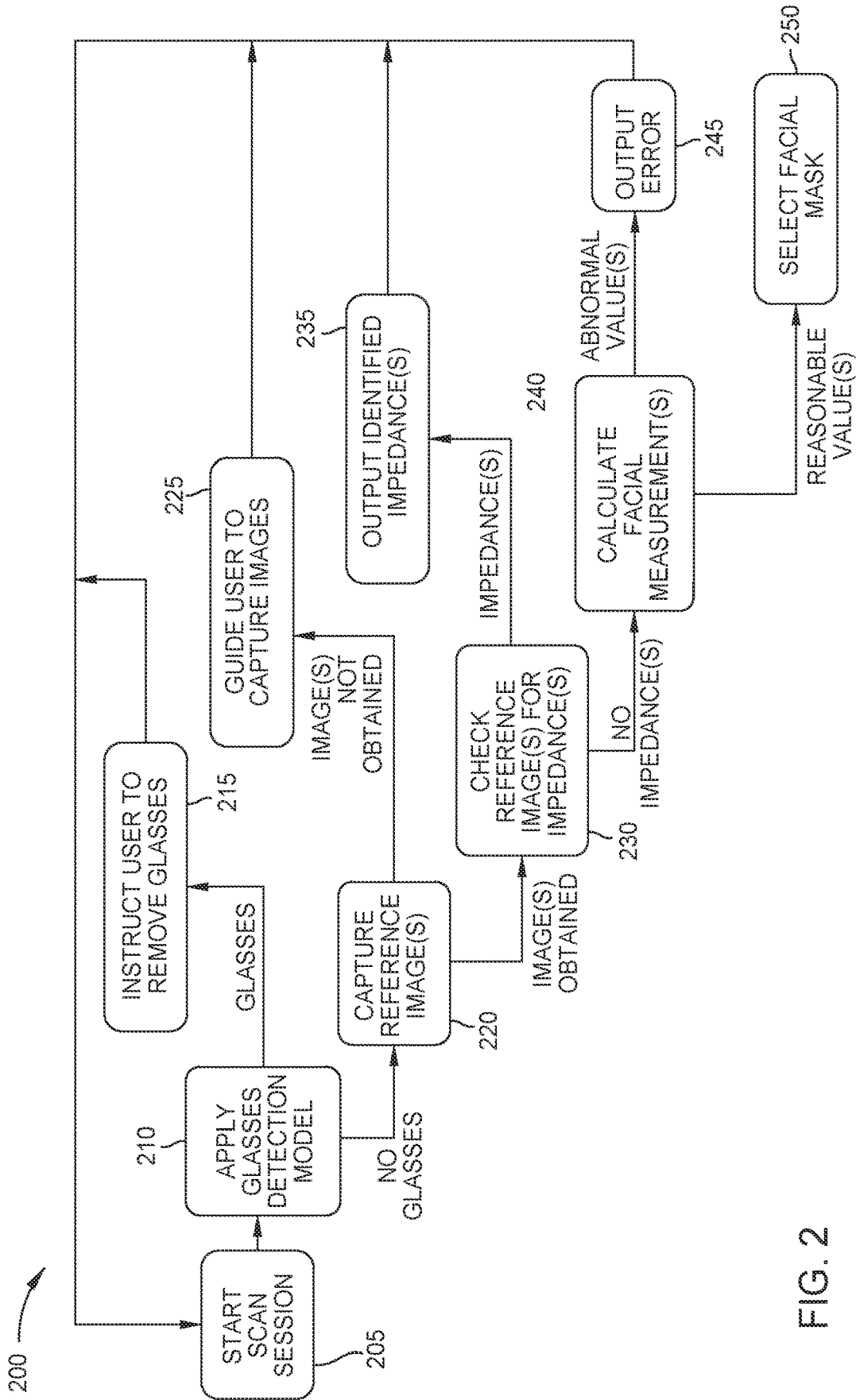
FIG. 2 depicts an example workflow for using machine learning to determine facial measurements based on captured images.

Example Workflow for Use of Machine Learning to Determine Facial Measurements Based on Captured Images FIG. 2 is an example workflow 200 for using machine learning to determine biometric (e.g., facial) measurements based on captured images. In some embodiments, the workflow 200 can be performed by a measurement system, such as the measurement system 105 described above with reference to FIG. 1. In some embodiments, as discussed above, the workflow 200 is performed locally on a user device. In at least one embodiment, the workflow 200 is performed within a web browser of the user device.

The workflow 200 begins at block 205, where the scan session is initiated. In some embodiments, the session is initiated by the user. For example, the user may request that the needed measurements be captured automatically (e.g., rather than manually entering them). In an embodiment, upon starting the scan session, the measurement system can output one or more instructions.

For example, the user may be provided with written instructions (e.g., via a display on the device, or as a printed document), verbal instructions (e.g., a prerecorded message, or a live voice chat with a provider), visual instructions (e.g., images and/or video output on the display, which may include prerecorded video or live video), and the like. In at least one embodiment, the instructions can suggest or indicate actions the user can take to ensure a successful scan, such as removing any glasses, keeping their mouth closed and eyes open, keeping their face centered and level in the frame, ensuring their hair is fully out of their face, ensuring there is adequate lighting, and the like.

In some embodiments, the measurement system (or the user, at the request of the measurement system) may enable the user's camera (e.g., webcam on a laptop, or forward-facing camera on a smartphone) and output the captured images on the user's display, superimposed with one or more guidelines or frames. For example, the measurement system may use an ellipse on the display to indicate where the user's face should be located (e.g., centered and level).

In at least one embodiment, the measurement system can also instruct the user regarding how to move during the scan. For example, the measurement system may instruct the user to turn their head from side to side throughout the scan. This can allow the measurement system to identify and select a set of reference images, from the stream of captured images, that match defined orientation criteria, as discussed in more detail below.

As illustrated, once the scan session is initiated, the measurement system begins capturing images and the workflow 200 proceeds to block 210, where the measurement system applies a trained glasses-detection machine learning model to determine whether the user is wearing glasses. As discussed above, the presence of glasses can cause various measurements such as iris width or diameter to be distorted. In an embodiment, to determine whether the user is wearing glasses, one or more frames in the video stream are processed using the glasses-detection model. One example of training a glasses-detection model is described in more detail below with reference to FIG. 6.

In at least one embodiment, every frame is processed using the model. In some embodiments, only a subset of the frames (e.g., every other frame, or every fifth frame) are processed using the model. In one embodiment, as soon as a single frame is determined to include glasses, the workflow 200 continues to block 215, where the measurement system instructs the user to remove their glasses. In another embodiment, the workflow 200 may proceed to block 215 only after a defined number of sequential frames (e.g., five frames in a row) or a defined percentage of frames (e.g., 75% of the previous frames) include glasses. This may help prevent false detections.

Generally, at block 215, the instruction can include a variety of outputs, including a verbal or audio reminder, a visual reminder (e.g., an icon appearing on the display), a textual reminder, and the like. The workflow 200 then returns to initiate the scan session and continues to collect images for review. In some embodiments, the measurement system can continue to collect images and evaluate them using the glasses-detection model, even while the user is warned to remove their glasses. This can allow the system to determine when the glasses are removed, without requiring that the user restart the process. In one embodiment, if the measurement system determines that the glasses have remained for at least some threshold (e.g., a number of sequential frames or a number of seconds), the measurement system can stop the scan session, instruct the user to remove their glasses, and prompt the user to restart the session when ready.

In the illustrated embodiment, once the measurement system determines that no glasses are present, the workflow 200 continues to block 220. In some embodiments, determining that no glasses are present includes confirming that predefined criteria, such as a minimum number of sequential frames, a minimum elapsed time, and the like have passed without detecting glasses in the input frames.

At block 220, the measurement system captures or selects a set of reference images from the video stream. Some examples of selecting the reference images are discussed in more detail below with reference to FIGS. 3 and 8. In an embodiment, capturing the reference images can generally include evaluating each frame of the video stream (captured by the user's camera) to determine the user's facial orientation, and selecting images that satisfy defined orientation criteria.

For example, the measurement system may use a trained machine learning model to determine the coordinate locations of various landmarks on the face, such as the tip of the nose, corners of the eyes, top of the head, bottom of the chin, and the like. Based on the arrangement of these coordinates, the measurement system can determine the orientation of the face. In some embodiments, the user's face orientation is includes one or more tilt measurements (e.g., a number of degrees up or down, and/or a number of degrees left or right) relative to the imaging sensor. Additionally, the orientation can include an angle measurement (e.g., a number of degrees turned left or right) indicating which direction the user is facing.

In some embodiments, the system can select three reference images: a forward facing image (e.g., with an angle that is within a predefined distance from zero), a left-facing image (e.g., with an angle within a predefined distance of a defined angular offset, such as twenty degrees), and a right-facing image (e.g., with an angle within a predefined distance from the defined angular offset in the other direction, such as negative twenty degrees). Although twenty degrees is given as an example target angle, in some aspects, the system seeks to capture reference images with the user's head turned as far to each side as possible (e.g., closer to 90 degrees) to increase accuracy of the nose depth determination. In an embodiment, because the user is instructed to slowly turn their heads from side to side, the measurement system can ensure that the user's face passes through these critical angles (e.g., zero, twenty, and negative twenty degrees) at least once during the scan. This may be more accurate and reliable than instructing the user to turn their head to a specific angle.

In some embodiments, rather than selecting reference images, the measurement system can select candidate reference images. That is, the measurement system may identify a set of images that meet each desired orientation, and evaluate these candidate images to select, for each orientation, a reference image (e.g., by checking for impedances in each candidate image).

If, at block 220, the measurement system is not able to obtain the needed reference images, the workflow 200 continues to block 225. In one embodiment, the measurement system can attempt to identify reference images for a minimum period of time (e.g., ten seconds) and/or evaluate a minimum number of frames before determining that the reference images cannot be extracted. At block 225, the measurement system can guide the user on how to capture sufficient images. For example, the measurement system may remind the user to ensure adequate lighting, to remove hair from their face, and the like. The user can then restart the scan session. Alternatively, in some aspects, the workflow 200 may return to block 220 rather than returning to the beginning of the process (e.g., rather than applying the glasses detection model anew).

If the measurement system determines, at block 220, that the needed reference images have been obtained, the workflow 200 continues to block 230, where the measurement system checks the reference images for defined impedances. Some examples of checking for impedances are discussed in more detail below with reference to FIGS. 4 and 9.

In at least one embodiment, checking for impedances includes evaluating each reference image using the glasses-detection model to confirm that the user is not wearing glasses in any of them. In some embodiments, the measurement system checks for impedances based on coordinate locations of various facial landmarks (e.g., eyes and mouth) to determine whether the user's eye(s) are closed, and/or whether the user's mouth is open.

If any impedances are detected in a reference image, the workflow 200 continues to block 235, where the measurement system outputs the identified impedance (e.g., indicating, to the user, that they need to keep their mouth closed). Similarly to the output at block 215, this output can include, for example, visual reminders, verbal or other audio reminders, textual reminders, and the like. In some embodiments, the measurement system is able to specifically indicate what corrective actions must be taken, because the measurement system evaluates the defined impedances individually, as discussed in more detail below.

In some embodiments, as discussed above, the measurement system may capture a set of candidate reference images for each desired orientation. In one such embodiment, rather than proceeding immediately to block 235, the measurement system may evaluate one or more of the other candidate reference images for the reference orientation, in order to determine whether the impedance remains in the alternatives as well. If so, the workflow 200 can continue to block 235. If not, the workflow 200 can continue to block 240 without requiring a re-scan.

If no impedances are detected in any reference image, the workflow 200 continues to block 240. At block 240, the measurement system calculates, computes, estimates, or otherwise determines a set of facial measurements for the user, based on the reference images. Some examples of computing the facial measurements are discussed in more detail below with reference to FIGS. 5 and 10.

For example, in at least one embodiment, the measurement system determines the user's facial height and nose width based on a forward-facing reference image. In some embodiments, as discussed above, the pixel-width measurements are converted to absolute measurements (e.g., in millimeters) based on a fixed reference value, such as the width of the average human iris. In an embodiment, the measurement system can use one or more of the angled images to determine the nose depth of the user.

In the illustrated workflow 200, the measurement system may then determine whether the measurements are valid based on whether they fall within defined ranges or ratios. For example, the measurement system may confirm that none of the measurements are negative, below a defined minimum value, or above a defined maximum value, each of which can indicate that some error occurred. For example, if the model estimates nose depth to be negative, or estimates that the facial height or some other measurement is one meter (e.g., outside of a known statistical range, or a known correlation between various facial measurements), the measurement system can determine that an error occurred.

If the values are abnormal (e.g., falling outside of the defined range(s)), the workflow 200 continues to block 245, where the measurement system outputs an error indicating that the scan failed. The user may then re-initiate the scan to try again, or enter their measurements manually. If the values are reasonable (e.g., falling within the defined range(s)), the workflow 200 continues to block 250, where the measurement system facilitates selection or design of a facial mask for the user based on the measurements. For example, the measurement system can transmit the facial measurements to a remote server that selects and returns the appropriate mask.

Example Workflow for Use of Machine Learning to Select Reference Images

Figure 3:
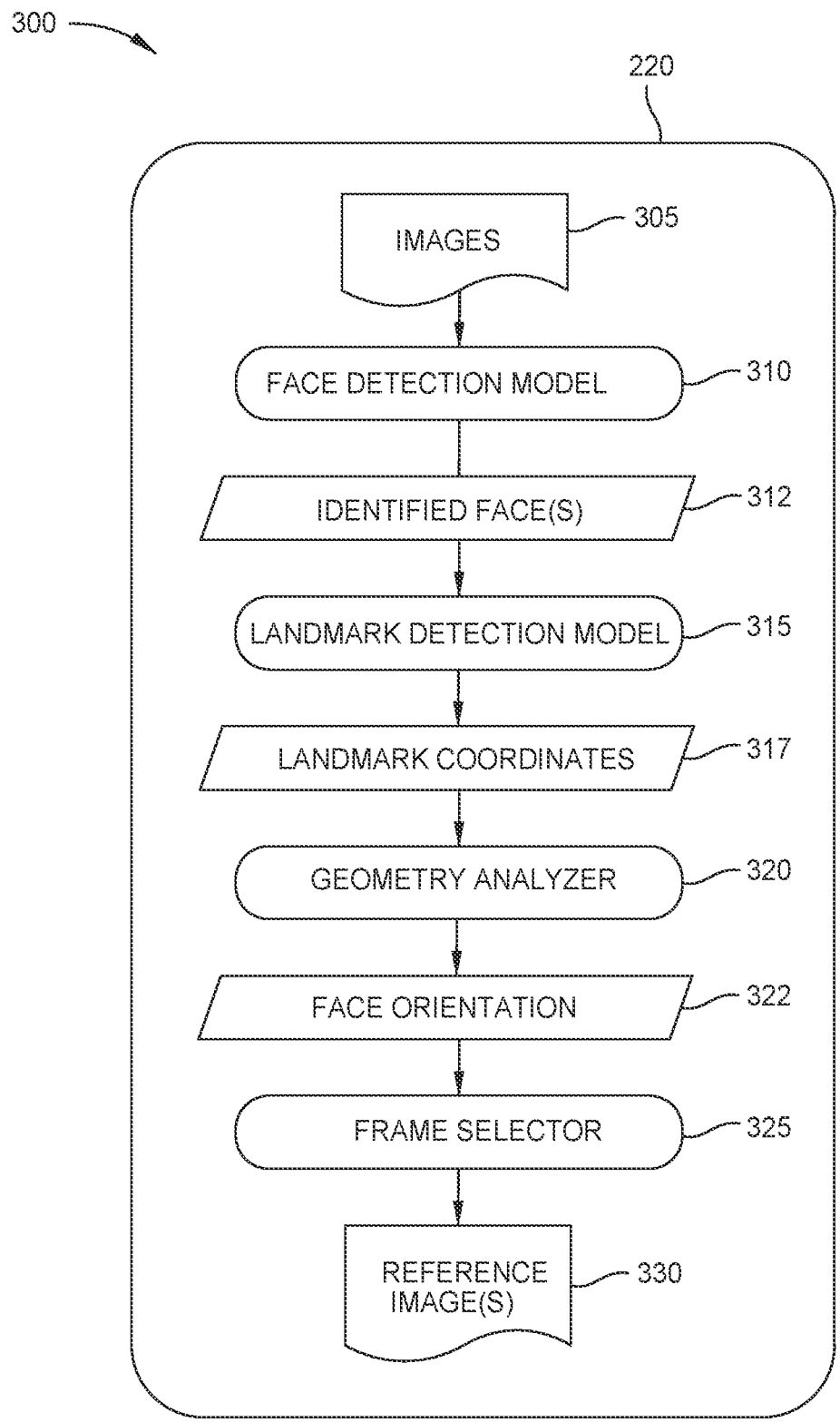
FIG. 3 depicts an example workflow for using machine learning to select reference images to determine facial measurements.

FIG. 3 is an example workflow 300 for using machine learning to select reference images to determine facial measurements. In one embodiment, the workflow 300 provides additional detail for block 220 in FIG. 2. Additionally, one example implementation of the workflow 300 may be described in more detail below with reference to FIG. 8.

The workflow 300 begins at block 305, where one or more images 305 are received or captured. For example, in some embodiments, a stream or sequence of images are received (e.g., as a video captured by the user's webcam). In at least one embodiment, the workflow 300 is performed for each such image (e.g., for each frame in the video). In some embodiments, the workflow 300, or portions thereof, can be selectively applied to a subset of the images (e.g., for every other frame).

At block 310, the images 305 are processed using a face detection model 310. The face detection model 310 is generally a machine learning model that has been trained to identify face(s) in input images. For example, in one embodiment, the face detection model 310 may correspond to or include a MediaPipe Face Detection model, a BlazeFace model, or other face-detection machine learning model. As illustrated, the face detection model 310 outputs, for each input image 305, an indication of any identified faces 312 in the image 305. Generally, the identified faces 312 indicate, for each face, its relative location in the image 305.

In some embodiments, if no faces are detected, the workflow 300 can terminate with respect to the given image 305, and begin anew with the next image 305. In at least one embodiment if a defined number of sequential images have been evaluated without identifying at least one face, the workflow 300 can terminate and the user can be prompted to reposition themselves in front of their camera. Additionally, in some embodiments, if multiple faces are detected in the identified faces 312, the measurement system selects the largest face for further processing, and ignores the remaining face(s). In other embodiments, the system may terminate the scanning process and instruct the user to perform the scan alone.

In the illustrated workflow 300, the identified face 312 (or largest identified face, if multiple are found) is then provided to a landmark detection model 315. That is, the image 305 (or the portion of the image that includes the identified face 312) is processed by a landmark detection model 315. Generally, the landmark detection model 315 is a trained machine learning model that identifies facial geometry of the face, and determines or estimates a variety of facial landmarks based on a single camera input (e.g., a single image 305) without the need for a dedicated depth sensor. For example, in one embodiment, the landmark detection model 315 may correspond to or include a MediaPipe Face Mesh model. Although facial landmarks are discussed in various examples herein, in some embodiments, the measurement system (and the landmark model) may be used to detect other landmarks on the user's body, in order to determine other body-related measurements.

As illustrated, the landmark detection model 315 outputs, for each landmark, a set of landmark coordinates 314. The landmark coordinates 317 generally indicate relative coordinates in three dimensions (e.g., x, y, and z) for each landmark or feature on the identified face 312 in the input image 305. However, though the landmark detection model 315 may output three-dimensional coordinate estimates, the estimation of depth based on the two-dimensional image 305 is generally approximate, rather than precise. That is, the model can generally identify features and measure pixel distances between them in the x-y plane (e.g., up, down, left, and right in the image 305) with significantly more accuracy than in the depth direction.

As illustrated, some or all of these landmark coordinates 317 are then provided to a geometry analyzer 320, which evaluates them to determine the face orientation 322 of the user, as depicted in the image 305. In an embodiment, the face orientation 322 indicates, for the image 305, the angle of the user's face in two or more dimensions (e.g., tilted up or down, tilted to the left or right, and/or turned to the left or right). In some embodiments, the face orientation 322 includes an angular value (e.g., a number of degrees) for each dimension, where the value indicates the number of degrees the user's face is angled, relative to the imaging sensor. That is, values close to zero may indicate that the user is facing (nearly) directly at the camera, while higher absolute values indicate that the user is facing away from the camera in one or more directions.

In the illustrated workflow 300, the face orientation 322 for the input image 305 is then evaluated by the frame selector 325, which compares the determined face orientation 322 to predefined orientation criteria. The measurement system may generally endeavor to select a set of reference images that satisfy these orientation criteria, which have been defined to ensure that accurate facial measurements can be taken.

As discussed above, though the landmark coordinates 317 can indicate a depth for each feature, in practice, these depth estimates are approximate and frequently inaccurate. Thus, though estimates relating to the nose width or facial height may generally be accurate in a frontal-facing image, nose depth is likely to be inaccurate. As the user turns their head to the side (e.g., as the facing angle moves away from zero), the nose depth dimension similarly rotates to be nearer to the x-y plane, enabling more accurate landmark detection. However, when the user has turned their head far enough that only a portion of their face is visible, the quality of the landmark estimates degrades substantially (e.g., because the landmark detection model 315 generally prefers whole-face data to determine facial features reliably).

In embodiments of the present disclosure, therefore, the measurement system can use one or more angled images (defined using the orientation criteria) to select one or more images where the user is facing off-center (e.g., turned to the left and/or right) by some defined amount, without turning too far. By detecting the angle of the face for each input image 305 (e.g., each frame in the video), the measurement system can determine the ideal point at which enough data to determine nose depth is captured, without obscuring the face, which would reduce the accuracy of the data.

In at least one embodiment, the frame selector 325 determines whether the face orientation 322 depicted in the input image 305 has a tilt (left and right, and/or up and down) that is less than some defined maximum (e.g., 8 degrees). The frame selector 325 can further determine if the face orientation 322 meets the turning angle criteria. In one embodiment, the frame selector 325 identifies three reference images: one with a facial turn of zero degrees (e.g., facing directly towards the camera, or within a defined tolerance from zero), one with a turn of 20 degrees (e.g., facing towards one side of the camera at an angle of 20 degrees, or within a defined tolerance from 20 degrees), and one with a turn of −20 degrees (e.g., facing towards the opposite side of the camera at an angle of 20 degrees, or within a defined tolerance from 20 degrees). As discussed above, other facial angles may be used in various embodiments (e.g., plus or minus 45 degrees from looking straight ahead).

In an embodiment, if the current face orientation 322 in the current image 305 does not meet any of these criteria, the image 305 is discarded and the measurement system analyzes the subsequent image. If the face orientation 322 satisfies at least one of the reference image criteria, the frame selector 325 can save this image 305 as a reference image 330 for further processing. In some embodiments, the measurement system saves a single reference image 330 for each desired orientation. In other embodiments, as discussed above, the measurement system may identify multiple candidate images for each desired orientation.

In an embodiment, the workflow 300 may be repeated until various termination criteria are satisfied, such as a maximum amount of time, a maximum number of frames that have been evaluated, determining that all of the reference images have been identified or selected, and the like. Once the reference images 330 have been identified (or other termination criteria is met), the workflow 300 terminates.

Example Workflow for Use of Machine Learning to Identify Image Impedances

Figure 4:
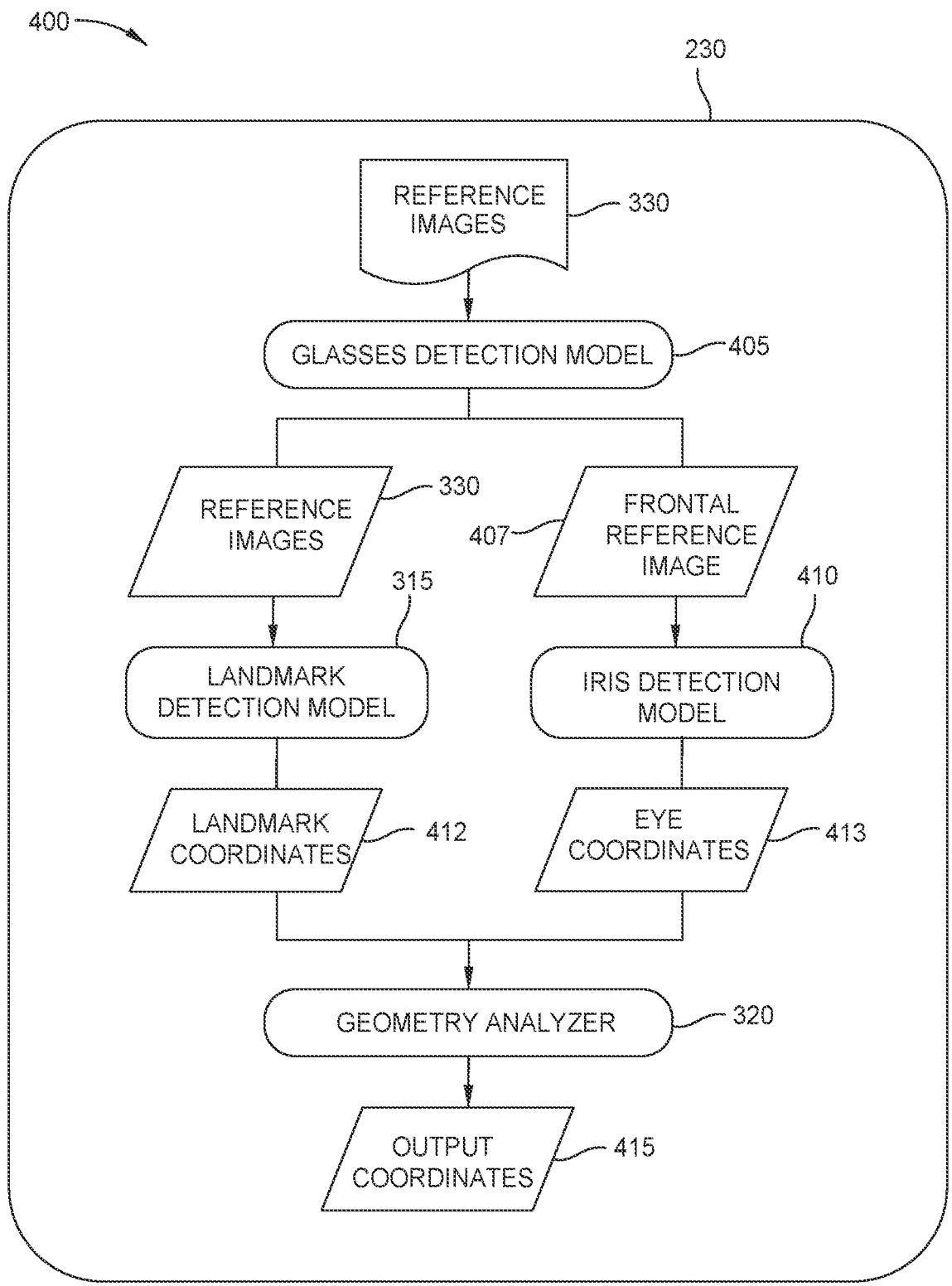
FIG. 4 depicts an example workflow for using machine learning to determine whether selected reference images include any impedances.

FIG. 4 is an example workflow 400 for using machine learning to determine whether selected reference images include any impedances. In one embodiment, the workflow 400 provides additional detail for block 230 in FIG. 2. Additionally, one example implementation of the workflow 400 may be described in more detail below with reference to FIG. 9.

The workflow 400 begins when a set of reference images 330 are received or identified (e.g., using the workflow 300 discussed above with reference to FIG. 3). In some embodiments, as discussed above, the reference images 330 generally include a frontal-facing image (e.g., with a facial angle that is within some predefined tolerance from zero degrees), and at least one angled image (e.g., with a facial angle that is within some predefined tolerance of some angle towards the side of the camera). In some embodiments, the reference images 330 includes two angled images (one facing towards each side of the camera), as discussed above.

As illustrated, the reference images 330 are first processed using a glasses detection model 405. That is, the presence of glasses is treated as an impedance for the measurement system, as glasses can obscure or distort various facial measurements (such as iris diameter). In some embodiments, the glasses detection model 405 is the same model that was applied at the outset of the scanning process (e.g., in block 210 of FIG. 2). Generally, the glasses detection model 405 is a machine learning model that has been trained to identify the presence of glasses on the faces of users in input images. By applying the glasses detection model 405 individually to each reference image 330, the measurement system can confirm that none of the reference images 330 include glasses on the user's face.

Though not included in the illustrated workflow 400 for conceptual clarity, in an embodiment, if any of the reference images 330 include glasses, the measurement system can discard the reference image. In some embodiments, the measurement system may then prompt the user to re-start the scan (after prompting them to remove their glasses). In at least one embodiment, the measurement system can determine whether any other candidate reference images for the orientation do not include glasses, as discussed above.

In the illustrated embodiment, once the measurement system has confirmed that none of the reference images 330 include glasses, the workflow 400 continues along two branches. In one branch, each reference image 330 is evaluated using the landmark detection model 315 (discussed above with reference to FIG. 3) to generate a respective set of landmark coordinates 412 (which may correspond to the landmark coordinates 317 that were determined during the workflow 300). Although the illustrated example includes application of the landmark detection model 315 to the reference images during the workflow 400, in some embodiments, the landmark coordinates 317, determined during the workflow 300, are saved alongside their corresponding reference images 330. In such an embodiment, the measurement system can re-use these prior-generated landmark coordinates 317 for each reference image 330, and need not re-generate them.

In the other branch of the workflow 400, one or more frontal-facing reference images 407 are processed using an iris detection model 410. Generally, the iris detection model 410 is a machine learning model that has been trained to provide fine-grained coordinates for eye-related landmarks on the face. In some embodiments, the iris detection model 410 may generally provide more accurate coordinate measurements for the eye landmarks, as compared to the more general landmark detection model 315. In some embodiments, the general landmark detection model 315 may lack landmark data for some aspects (such as the eyelids), which are provided using the iris detection model 410. Additionally, though depicted as a separate model for conceptual clarity, in some embodiments, the iris detection model 410 is build on the landmark detection model 315 (e.g., as an additional one or more layers on the underlying model). For example, in one embodiment, the iris detection model 410 may correspond to or include a MediaPipe Iris model.

As illustrated, the iris detection model 413 outputs, for one or more eye-related landmarks, a set of eye coordinates 413. The eye coordinates 413 generally indicate relative coordinates in three dimensions (e.g., x, y, and z) for each eye-related landmark or feature on the face of the user. For example, the eye coordinates 413 may indicate the top of each eye, bottom of each eye, inner and outer corners of each eye, the edges of the pupil and/or iris of each eye, and the like. Although a separate iris detection model 410 is depicted, in some embodiments, the eye coordinates 413 can also be generated by the landmark detection model 315.

In the illustrated workflow 400, the geometry analyzer 320 can then receive the landmark coordinates 412 for each reference image 330 and the eye coordinates 413 for the frontal reference image(s) 407, and evaluate them to confirm that no impedances are present.

In some embodiments, this includes evaluating the landmark coordinates 412 to confirm that the user's mouth is closed. For example, the measurement system can determine a ratio of the mouth width to mouth height, and compare this ratio to a defined threshold. If the determined ratio is below the threshold (e.g., such that height is larger than expected, given the width), the measurement system can determine or infer that the user's mouth is open.

Similarly, in some embodiments, evaluating the data for impedances includes evaluating the eye coordinates 413 to confirm that one or more of the user's eyes are open in the frontal reference image 407. For example, the measurement system can determine, for each eye, a ratio of the eye width to eye height, and compare this ratio to a defined threshold. If the determined ratio is above the threshold (e.g., such that height is smaller than expected, given the width), the measurement system can determine or infer that the user's eye is closed. In some embodiments, the measurement system evaluates each eye individually. If either eye (or both eyes) is closed, the geometry analyzer 320 may determine that the frontal reference image 407 includes an impedance. In another embodiment, as long as at least one eye is open, the measurement system may determine that no impedances are present.

Though not included in the illustrated workflow 400 for conceptual clarity, in an embodiment, if the geometry analyzer 320 determines that any of the reference images 330 include an impedance (such as an open mouth or closed eye), the measurement system can discard the reference image. In some embodiments, the measurement system may then prompt the user to re-start the scan (after instructing them to keep their mouth closed and/or eyes open). In at least one embodiment, the measurement system can first determine whether any other candidate reference images for the relevant orientation do not include the impedance, as discussed above.

If none of the reference images 330 include impedances, the workflow 400 terminates at block 415, where the measurement system outputs, for each respective reference image 330, a respective set of output coordinates 415. In some embodiments, the output coordinates 415 can include a set of tuples, where each tuple corresponds to a respective landmark. In such an embodiment, each tuple may indicate an identifier for the respective landmark, and a set of (x, y, z) coordinates for the landmark. Generally, these output coordinates include one or more of the landmark coordinates 412 and one or more of the eye coordinates 413. These output coordinates 415 can then be used by downstream processing to determine the facial measurements.

Example Workflow for Determining Facial Measurements Based on Reference Images

Figure 5:
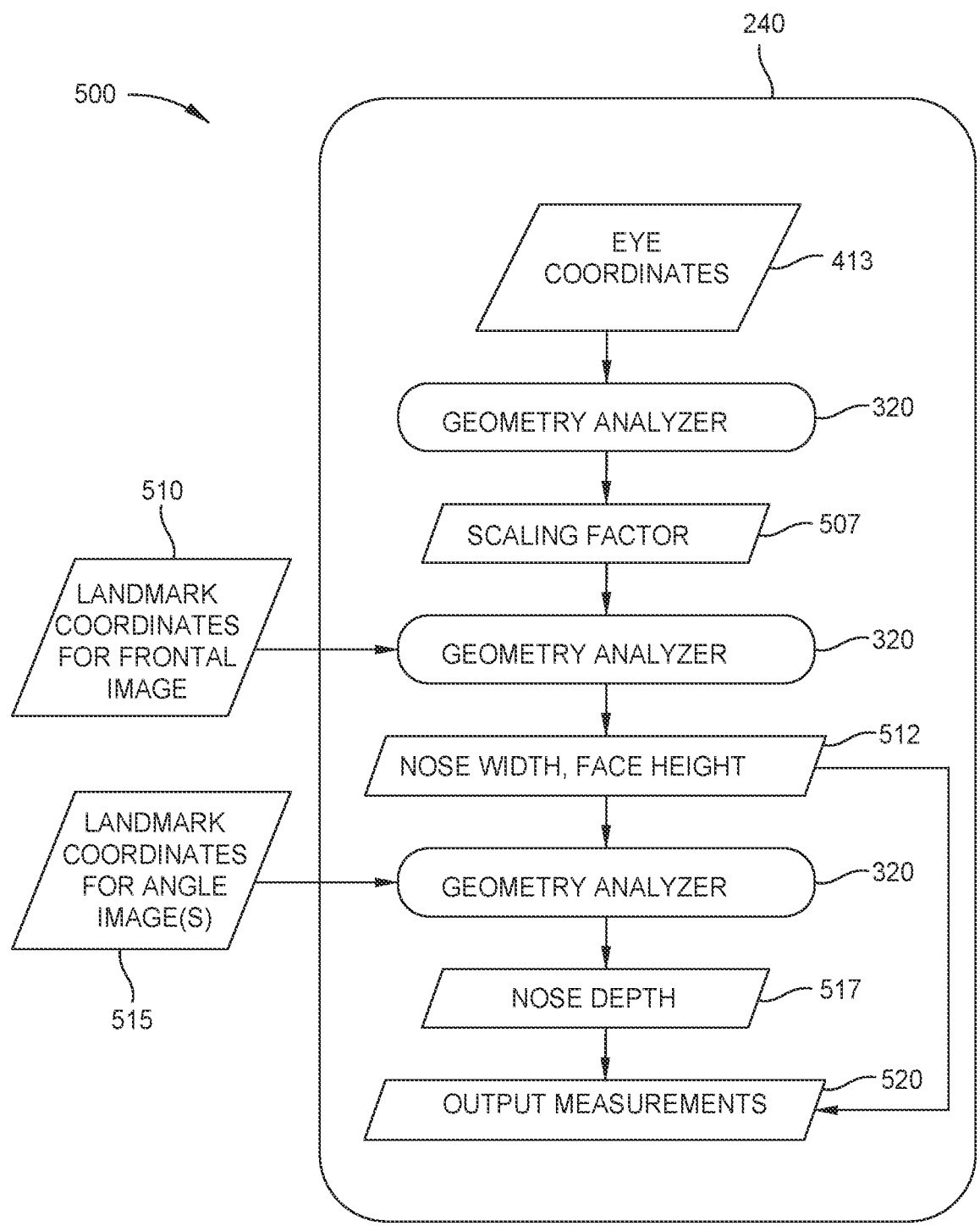
FIG. 5 depicts an example workflow for determining facial measurements based on selected reference images.

FIG. 5 is an example workflow 500 for determining facial measurements based on selected reference images. In one embodiment, the workflow 500 provides additional detail for block 240 in FIG. 2. Additionally, one example implementation of the workflow 500 may be described in more detail below with reference to FIG. 9.

The workflow 500 begins when eye coordinates 413 are received (e.g., from the workflow 400 discussed above with reference to FIG. 4). These eye coordinates 413 are evaluated by the geometry analyzer 320 to determine a scaling factor 507 for the frontal reference image. Generally, the scaling factor 507 indicates a ratio of pixels, in the image, to an absolute measurement unit. For example, the scaling factor 507 can indicate the number of pixels-per-millimeter for the image. That is, the scaling factor 507 can indicate the number of pixels (in the reference image) that correspond to one millimeter (or any other unit of measurement) on the face of the user.

In at least one embodiment, the geometry analyzer 320 generates the scaling factor 507 by retrieving the horizontal iris diameter, vertical iris diameter, or average of the horizontal and vertical iris diameter, which is provided in pixels in the eye coordinates 413, and determining the iris diameter in another measurement unit, such as millimeters (e.g., based on a predefined fixed value). Although use of the horizontal iris diameter or width is discussed in some examples, in some embodiments, the system may use the vertical iris diameter or other iris diameter. In some embodiments, the measurement system determines the iris diameter (in pixels) for both the left and right eye (if available), and averages these values to determine the scaling factor 507. In some embodiments, the iris diameters are averaged for the front-facing reference image. In one such embodiment, for the angled images, the larger iris is used. As discussed below in more detail, this scaling factor 507 can be used to estimate various measurements of the user's face, such as facial height and nose width.

As illustrated, the scaling factor 507 and the landmark coordinates from the frontal reference image 510 are then evaluated by the geometry analyzer 320 to output a nose width and face height 512 for the user, based on the frontal reference image. For example, as discussed above, the geometry analyzer 320 may determine the width of the user's nose, in terms of the number of pixels in the reference image, and use the scaling factor 507 to convert this value to an absolute measurement in millimeters or some other unit. Similar evaluation can be used to determine the absolute facial height in millimeters or some other unit.

The workflow 500 then continues, and the nose width and face height 512 are evaluated by the geometry analyzer 320, along with the landmark coordinates for one or more angled reference images 515, to determine the nose depth 517.

In some embodiments, this process includes determining a relative scale of the angled reference image, with respect to the frontal-reference image. Often, in the angled reference image(s), the system loses reliable visibility into the diameter of the irises (e.g., because one or both irises become entirely or partially hidden), which, as discussed above, can be used to determine the scaling factor 507. In some embodiments, therefore, the measurement system uses the maximum iris diameter (e.g., the iris closer to the camera) for determining the scale of the angled images. In another aspect, the system measures the facial height of the user, in pixels, in the angled image (e.g., because the user may have shifted closer to or farther from the camera during the turn). This angled facial height measurement can then be compared with the determined facial height (measured in pixels) in the frontal reference image, in order to produce a relative scale value that can be used to scale the angled image measurements, enabling determination of the nose depth in the absolute measurement unit (e.g., millimeters) used by the system. In an embodiment, this relative scale can be determined separately for each angled reference image.

In some embodiments, once the relative scale of the angled image has been determined, the geometry analyzer 320 determines the nose depth by determining the apparent distance between the tip of the user's nose and the edge of the user's nose (e.g., indicated by the alar-facial groove), as reflected in the landmark coordinates for the angled image(s) 515. This value, in combination with the previously-determined nose width and the known facial angle in the angled reference image, can be used to compute the nose depth of the user.

For example, in one embodiment, the nose depth is defined as $$n_d = \frac{n_e}{\sin(\Theta)},$$

where $n_d$ is the nose depth, $n_e$ is the visible distance between the nose tip to the nose edge, and $\Theta$ is the angle of the user's head in the image.

In another embodiment, the nose depth is calculated as $$n_d = \frac{n_e - \frac{1}{2}n_w\cos(\Theta)}{\sin(\Theta)},$$

where $n_d$ is the nose depth, $n_e$ is the visible distance between the nose tip to the nose edge, $n_w$ is the nose width (determined in the front-facing image), and $\Theta$ is the angle of the user's head in the image.

In some embodiments, the measurement system can use this process to determine the nose depth reflected in each angled reference image (e.g., from the left and from the right). These values can then be averaged to determine the nose depth 517.

As illustrated, the workflow 500 terminates with a set of output measurements 520. In at least one embodiment, the output measurements 520 include the nose width and facial height 512, as well as the nose depth 517, of the user. These output measurements 520 can then be used to perform a variety of tasks, such as facial mask selection or design.

Example Method for Training a Machine Learning Model to Detect Glasses

Figure 6:
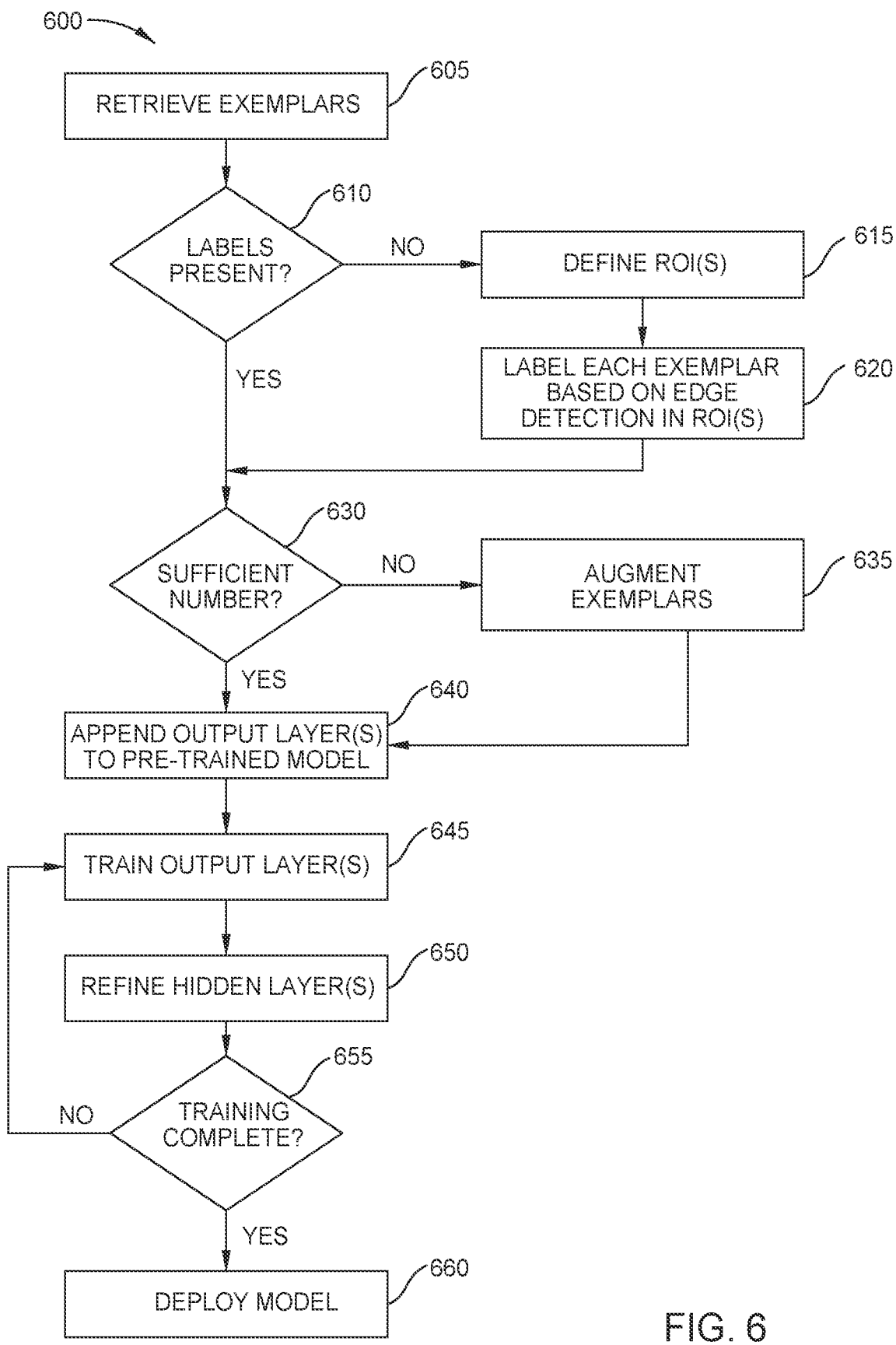
FIG. 6 depicts a flow diagram depicting an example method for training a machine learning model to detect the presence of glasses in user images.

FIG. 6 is a flow diagram depicting an example method 600 for training a machine learning model to detect the presence of glasses in user images. For example, the method 600 may be used to train or refine the glasses detection model 405, discussed above with reference to FIG. 4.

In some embodiments, the method 600 is performed by the measurement system. In other embodiments, the method 600 may be performed on one or more remote systems. For example, a healthcare provider that provides the measurement system functionality (e.g., that provides software that can be executed on local user devices to determine facial measurements) may also train the glasses detection model, and provide this trained model to users to enable the measurement system functionality.

The method 600 begins at block 605, where the training system retrieves one or more exemplars to train the glasses detection model. Generally, each exemplar is an image depicting the face of a human user, where the user may or may not be wearing glasses.

At block 610, the training system determines whether the exemplars include labels. That is, the training system can determine, for each training image, whether the image has a corresponding label indicating whether or not the depicted user is wearing glasses. If the exemplars already include labels, the method 600 continues to block 630.

If, however, the training system determines that at least one of the exemplars is unlabeled, the method 600 continues to block 615. At block 615, the training system defines one or more regions of interest (ROI) for each unlabeled exemplar. In one embodiment, the ROIs are defined based in part on landmarks of the depicted face, and correspond to locations where glasses, if present, will be visible in the image. For example, the training system may define ROIs corresponding to the bridge of the nose (e.g., between the eyes, where the bridge of the glasses rests), above and/or below each eye (where the frame may be visible), and the like. In some embodiments, the ROIs are defined by an administrator to enable efficient labeling of the exemplars.

At block 620, the training system labels each unlabeled exemplar by applying one or more edge detection techniques to each defined ROI in the unlabeled image. In one embodiment, this includes applying facial landmark detection (e.g., using the landmark detection model 315 discussed above with reference to FIG. 3) to process the exemplar, and using the returned landmark coordinates to place the ROIs in the appropriate on the exemplar (e.g., between the eyes, just below each eye, and the like). In another embodiment, if the exemplars all include the face of the subject at relatively the same position (e.g., centered in the frame), the training system can simply define the ROIs as fixed coordinate locations on each image.

In one embodiment, the training system uses edge detection to identify edges in the y-direction of the exemplar. That is, the training system can identify horizontal edges in the identified ROIs. In an embodiment, if a horizontal edge is detected in one or more of the ROIs (e.g., the bridge of the nose, above each eye, and/or under each eye), the training system can infer that the user is wearing glasses. In some embodiments, the training system determines that the user is wearing glasses only if the edge detection identifies an edge in all of the ROIs. Once the exemplars are each labeled, the method 600 continues to block 630.

At block 630, the training system determines whether there is a sufficient number of training exemplars. For example, the training system may determine whether there is at least some threshold number of exemplars (defined by the administrator) to result in a sufficiently accurate glasses detection model. If a sufficient number of exemplars have been obtained, the method 600 continues to block 640.

If the training system determines that an insufficient number of exemplars have been obtained, the method 600 continues to block 635, where the training system augments the exemplars. Generally, augmenting the exemplars includes performing various transformations to each in order to generate additional samples. For example, for a given exemplar, the training system may generate one or more additional exemplars by rotating it left or right by some value (or by a variable amount), inverting or reversing it (e.g., mirroring it), adding noise to the image, and the like. Once a sufficient number of exemplars have been created via augmentation, the method 600 continues to block 640.

In the illustrated embodiment, at block 640, the training system appends one or more output layers to a pre-trained model. Although a pre-trained model is discussed in the illustrated example, in some embodiments, a new model is trained from scratch. In the illustrated example, a pre-trained model may be used to enable transfer learning to the target domain of glasses detection. By relying on a pre-trained model, the training system can take advantage of one or more other models that have been trained on substantially large datasets, which can result in improved feature extraction and therefore improved glasses detection. In at least one embodiment, the training system uses a MobileNetV2 model as the pre-trained model.

In one embodiment, appending the output layers includes adding one or more pooling layers, as well as one or more dense (e.g., fully connected) layers to perform the final classification. For example, the training system may use a global average pooling layer, followed by a sigmoid output layer that classifies the input activations into one of two categories: glasses, or no glasses. In some embodiments, the training system can further use dropout or other regularization techniques during training, in order to prevent overfitting and improve the reliability and accuracy of the model.

At block 645, the training system trains the appended output layers based on one or more of the exemplars. For example, the training system may pass the exemplar through the model to generate an output classification (referred to as a "forward-pass"), and compare the classification to the actual label of the exemplar to compute a loss. The loss can then be used to refine one or more weights or other parameters of the output layers (referred to as "backward propagation" or a "backwards-pass"). This trains the model iteratively to return more accurate classifications. In various embodiments, this training may be performed individually for each sample (e.g., using stochastic gradient descent) or collectively for a batch of multiple samples (e.g., using batch gradient descent).

At block 650, the training system optionally refines one or more of the hidden layers of the pre-trained model based on the exemplar(s) (e.g., based on the loss computed using the exemplar(s)). In some aspects, refining these internal layers may enable more robust detections. In some embodiments, the training system refines only a subset of the hidden layers. For example, the training system may refine the final N layers (e.g., the final 56 layers), where N is defined by the administrator. Similarly, the training system may keep the first M hidden layers in the pre-trained model (e.g., the first 100 layers) fixed and refine all subsequent layers, where M is defined by the administrator.

At block 655, the training system determines whether the training is complete. This may be based on a variety of completion criteria, including a maximum number of training epochs or a maximum amount of time, a desired model accuracy, a determination that no training exemplars remain, and the like. If training is not complete, the method 600 returns to block 645. If training is complete, the method 600 terminates at block 660, where the model is deployed.

In some embodiments, prior to deployment, the training system can perform one or more optimization or pre-processing operations to enable the model to be deployed to user systems. For example, in one embodiment, the training system can use quantization to reduce the size of the model. Generally, model quantization involves converting one or more weights, biases, or other parameters of the model from floating point format to integer format. While some model accuracy may be lost, such quantization can significantly reduce the model size, thereby enabling it to be transferred over a network to be executed on the client device (e.g., in the user's browser).

Figure 7:
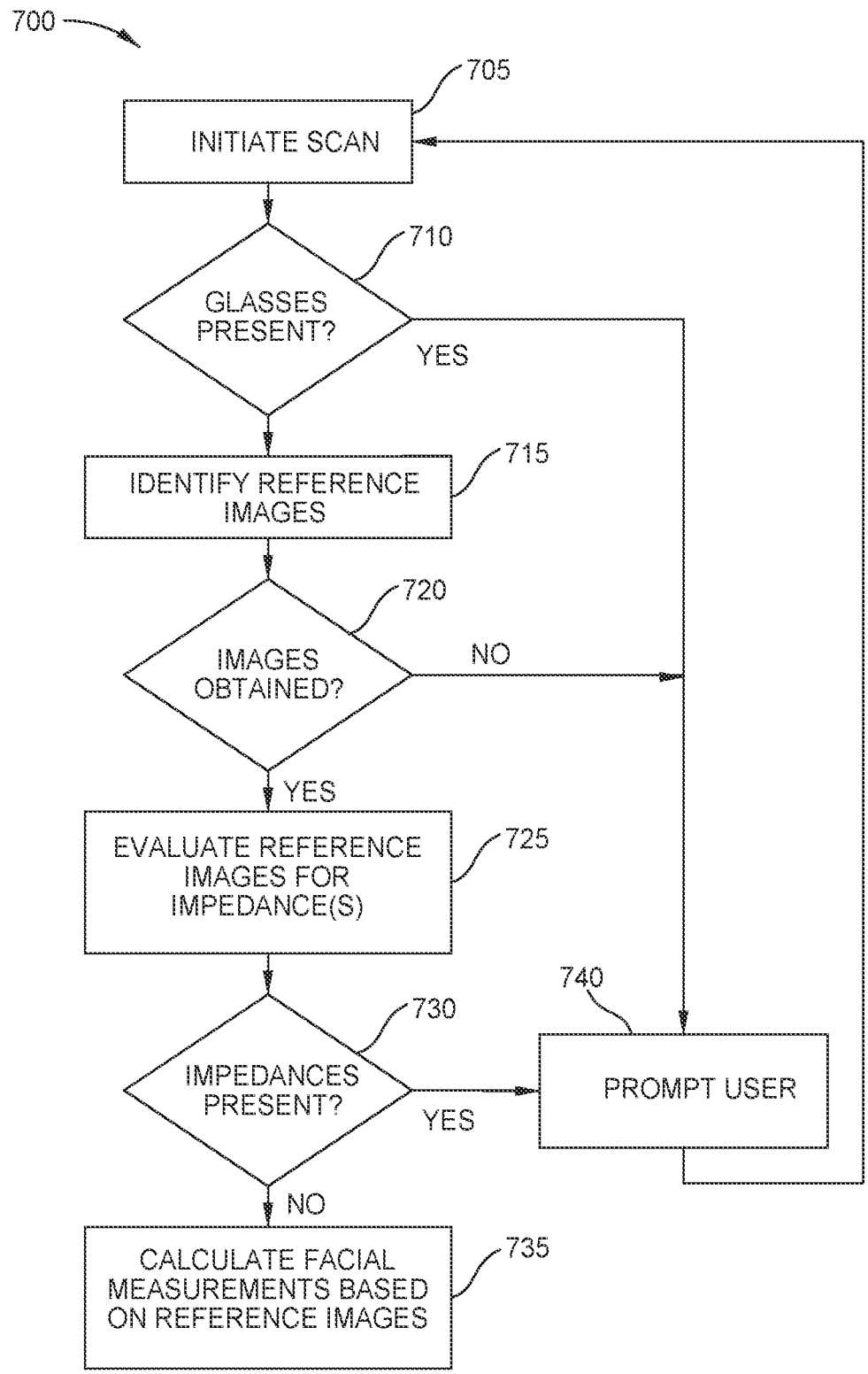
FIG. 7 depicts a flow diagram depicting an example method for using machine learning to determine facial measurements based on captured images.

Example Method for Use of Machine Learning to Determine Facial Measurements Based on Captured Images FIG. 7 is a flow diagram depicting an example method 700 for using machine learning to determine facial measurements based on captured images. In some embodiments, the method 700 is performed by a measurement system (e.g., the measurement system 105 of FIG. 1). In one embodiment, the method 700 may provide additional detail for the workflow 200, discussed above with reference to FIG. 2.

The method 700 begins at block 705, where the measurement system initiates a scan of a user's face. For example, the user may agree or trigger the scan to be initiated. In some embodiments, the scan is initiated after the measurement system presents instructions or guidance to the user to achieve a successful scan. For example, the measurement system may instruct the user to remove glasses, keep their mouth closed and eyes open, ensure adequate lighting, place their face centered in the frame, and turn their face slowly from side to side.

Upon initiating the scan, a stream of images are captured by the user's camera. At block 710, the measurement system evaluates one or more of these images to determine whether the user is wearing glasses (e.g., using a trained glasses detection model), as discussed above. If so, the method 700 continues to block 740, where the measurement system prompts the user to remove their glasses. The method 700 then returns to block 705 to re-initiate (or continue) the scan.

If, at block 710, the measurement system determines that the user is not wearing glasses, the method 700 continues to block 715. At block 715, the measurement system identifies and selects a set of one or more reference images from the video stream. For example, as discussed above, the measurement system may select images where the user's face meets defined orientation criteria (e.g., one image with the user facing directly towards the camera, one image with the user facing to the right of the camera at a defined angle, and one image with the user facing towards the left of the camera at a defined angle).

At block 720, the measurement system determines whether these reference images were successfully obtained (e.g., after a defined period of time). If not, the method 700 continues to block 740, where the measurement system prompts the user to restart the scan. In some embodiments, this prompt includes reminders relating to the above-discussed instructions, such as a reminder to ensure adequate lighting is available, a reminder to keep hair out of the user's face, a reminder to remove hats and glasses, and the like. The scan can then be re-initiated.

If, at block 720, the measurement system determines that the reference images were successfully obtained, the method 700 continues to block 725, where the measurement system evaluates the reference images for impedances, as discussed above. For example, the measurement system may confirm that none of the images include the user wearing glasses, that the user's mouth is not open in any of them, that the user's eyes are open in each, and the like.

At block 730, the measurement system determines whether any impedances were detected. If so, the method 700 continues to block 740, where the measurement system prompts the user to rectify the identified impedance(s). For example, if the measurement system determined that the user was wearing glasses, the measurement system reminds the user to remove them during the scan. If the measurement system determined that the user's mouth was open, the measurement system can remind the user to keep their mouth closed during the scan. Similarly, if the measurement system determined that the user's eyes were closed, the measurement system can remind the user to keep their eyes open. The scan can then be re-initiated.

If, at block 730, the measurement system does not detect any impedances, the method 700 continues to block 735, where the measurement system calculates the facial measurements based on the reference images, as discussed above. These measurements can then be used (locally by the measurement system, or transmitted to a remote system) to drive facial mask selection (e.g., selecting a pre-made mask) and/or customization (e.g., modifying a pre-made mask, making a new custom-fit mask, and the like).

In some embodiments, the measurement system can hide some or all of the image processing from the user in order to improve the user experience and cause the process to appear seamless and quick. For example, once reference images are selected and/or validated, the measurement system may display a "sending data" indication while the images are being analyzed and/or the measurements are being calculated. The measurements can then be transmitted when ready, and the measurement system can inform the user that the scan was successful.

Example Method for Use of Machine Learning to Select Reference Images

Figure 8:
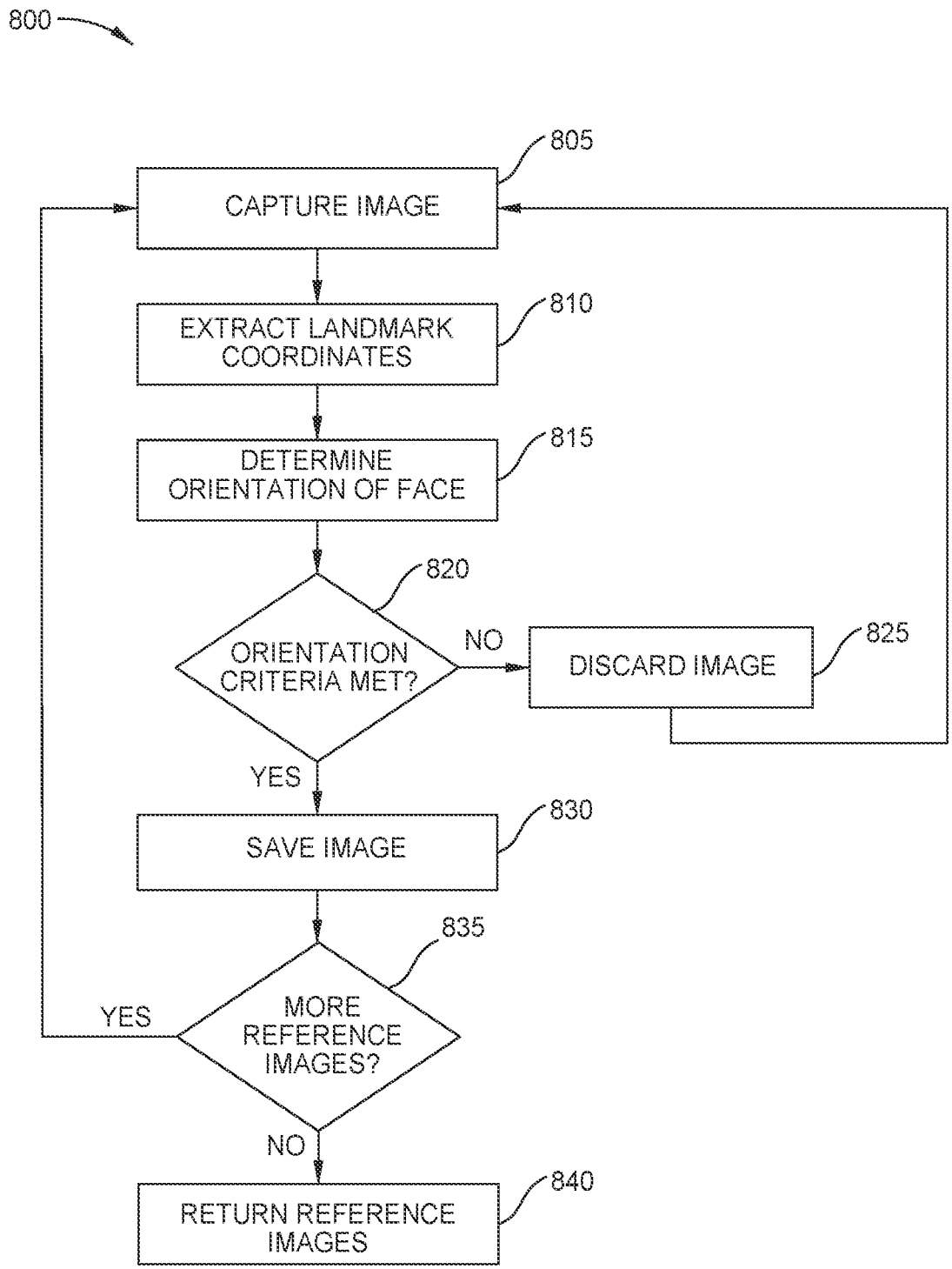
FIG. 8 depicts a flow diagram depicting an example method for using machine learning to select reference images to determine facial measurements.

FIG. 8 is a flow diagram depicting an example method 800 for using machine learning to select reference images to determine facial measurements. In some embodiments, the method 800 is performed by a measurement system (e.g., the measurement system 105 of FIG. 1). In one embodiment, the method 800 may provide additional detail for block 220 of FIG. 2, for the workflow 300 of FIG. 3, and/or for block 715 of FIG. 7.

The method 800 begins at block 805, where the measurement system capture an image (e.g., a frame in a stream of video) of the user.

At block 810, the measurement system extracts landmark coordinates from the captured image as discussed above. For example, the measurement system may process all or a subset of the image using the landmark detection model 310 to generate the relative coordinates of each landmark or feature on the user's face.

At block 815, the measurement system determines the orientation of the user's face, as depicted in the captured image, based on the extracted landmark coordinates. For example, as discussed above, the measurement system may determine an offset value indicating, for each direction (e.g., tilted up/down, turned left/right, and/or tilted left/right) how far the user's face is angled, relative to the imaging sensor (where a value of zero indicates that the user is facing directly towards the camera, with respect to that dimension).

At block 820, the measurement system determines whether the defined orientation criteria are satisfied by the determined facial orientation. For example, as discussed above, the measurement system may determine whether the facial tilt is below a defined threshold. Further, in some embodiments, the measurement system determines whether the user's face is turned at a defined angle. In some embodiments, as discussed above, the measurement system uses three defined angles (e.g., an angle of zero degrees, and an angle of +/−twenty degrees).

If the measurement system determines that the orientation criteria are not met (e.g., that the user's face is not at the proper orientation to serve as a reference image), the method 800 continues to block 825, where the image is discarded. The method 800 then returns to block 805 to evaluate the next image.

If, at block 820, the measurement system determines that the orientation criteria is satisfied with respect to at least one of the desired reference orientations, the method 800 proceeds to block 830. As discussed above, in some embodiments, the measurement system can determine whether the current facial orientation is within a defined threshold distance from the target orientation (e.g., such that an angle of 0.5 degrees is considered sufficiently close to zero, and the image can be used as the front-facing reference image).

In some embodiments, once a reference image is found for a particular reference orientation, the measurement system can stop comparing future images to this orientation. That is, the measurement system may return exactly one reference image for each reference orientation. In other embodiments, the measurement system may continue to compare images to these completed orientations, enabling the measurement system to identify candidate images that may serve as a back-up image if the selected reference image has impedances or is otherwise insufficient.

At block 830, the measurement system saves the current image as a reference image for further processing. The method 800 then continues to block 835, where the measurement system determines whether one or more reference images are still needed. That is, the measurement system determines whether there is at least one defined reference orientation that does not yet have a corresponding reference image. If so, the method 800 continues to block 805 to evaluate the next image.

Although not included in the illustrated example, in some embodiments, prior to returning to block 805, the measurement system can first determine whether one or more defined termination criteria are satisfied. For example, the measurement system may determine whether a defined maximum period of time has been spent evaluating images, whether a defined maximum number of images have been evaluated, whether the newly-received images even include the face of a user, and the like. If the termination criteria are satisfied, the measurement system can stop the scan and prompt the user, as discussed above.

Returning to block 835, if the measurement system determines that all needed reference images have been obtained, the method 800 terminates at block 840, where the measurement system returns the selected reference images for further processing.

Example Method for Use of Machine Learning to Identify Image Impedances

Figure 9:
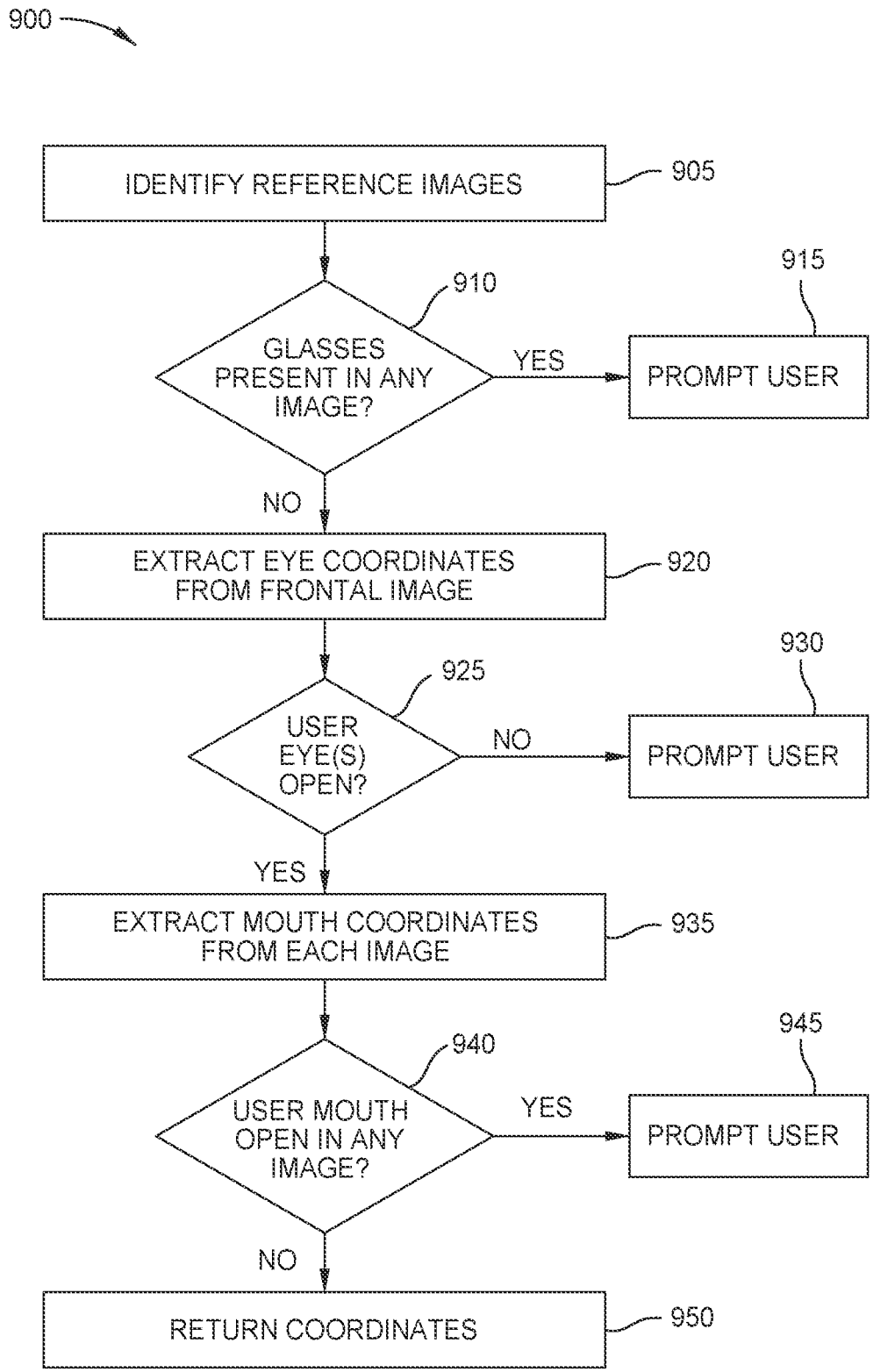
FIG. 9 depicts a flow diagram depicting an example method for using machine learning to determine whether selected reference images include any impedances.

FIG. 9 is a flow diagram depicting an example method 900 for using machine learning to determine whether selected reference images include any impedances. In some embodiments, the method 900 is performed by a measurement system (e.g., the measurement system 105 of FIG. 1). In one embodiment, the method 900 may provide additional detail for block 230 of FIG. 2, for the workflow 400 of FIG. 4, and/or for blocks 725, 730, and 740 of FIG. 7.

The method 900 begins at block 905, where the measurement system identifies the reference images (e.g., selected using the method 800 discussed above with reference to FIG. 8).

At block 910, the measurement system evaluates the reference images to ensure that none of them depict the user wearing glasses (e.g., using the glasses-detection model). If the user is wearing glasses in one or more of the reference images, the method 900 continues to block 915, where the measurement system prompts the user to remove their glasses. The scanning process can then be re-started. Alternatively, in some embodiments, the measurement system can first determine whether any alternative reference images exist, as discussed above. If so, the measurement system need not prompt the user until all such alternatives have been similarly evaluated and discarded.

If, at block 910, the measurement system determines that none of the images depict the user wearing glasses, the method 900 continues to block 915, where the measurement system extracts eye coordinate information from the front-facing reference image. For example, the measurement system may process the reference image using the iris detection model 410 of FIG. 4 to extract the fine-grained eye-related coordinates.

At block 925, the measurement system evaluates the eye coordinates to determine whether both (or at least one of) the user's eyes are open in the front-facing image. If not, the method 900 continues to block 930, where the measurement system prompts the user to keep their eyes open. The scanning process can then be re-started. Alternatively, in some embodiments, the measurement system can first determine whether any alternative reference images exist, as discussed above. If so, the measurement system need not prompt the user until all such alternatives have been similarly evaluated and discarded.

If, at block 925, the measurement system determines that the user's eyes are open in the front-facing reference image, the method 900 continues to block 935, where the measurement system extracts mouth coordinate information from each of the reference images. For example, the measurement system may process the reference image using the landmark detection model 315 to extract the mouth coordinates.

At block 940, the measurement system evaluates the mouth coordinates to determine whether the user's mouth is open in any of the reference images. If so, the, the method 900 continues to block 945, where the measurement system prompts the user to keep their mouth closed throughout the scanning process. The scanning process can then be re-started. Alternatively, in some embodiments, the measurement system can first determine whether any alternative reference images exist, as discussed above. If so, the measurement system need not prompt the user until all such alternatives have been similarly evaluated and discarded.

If, at block 940, the measurement system determines that the user's mouth is closed in each reference image, the method 900 continues to block 950, where the measurement system considers the reference images to be validated, and returns the determined facial landmark coordinates for downstream processing.

Example Method for Determining Facial Measurements Based on Reference Images

Figure 10:
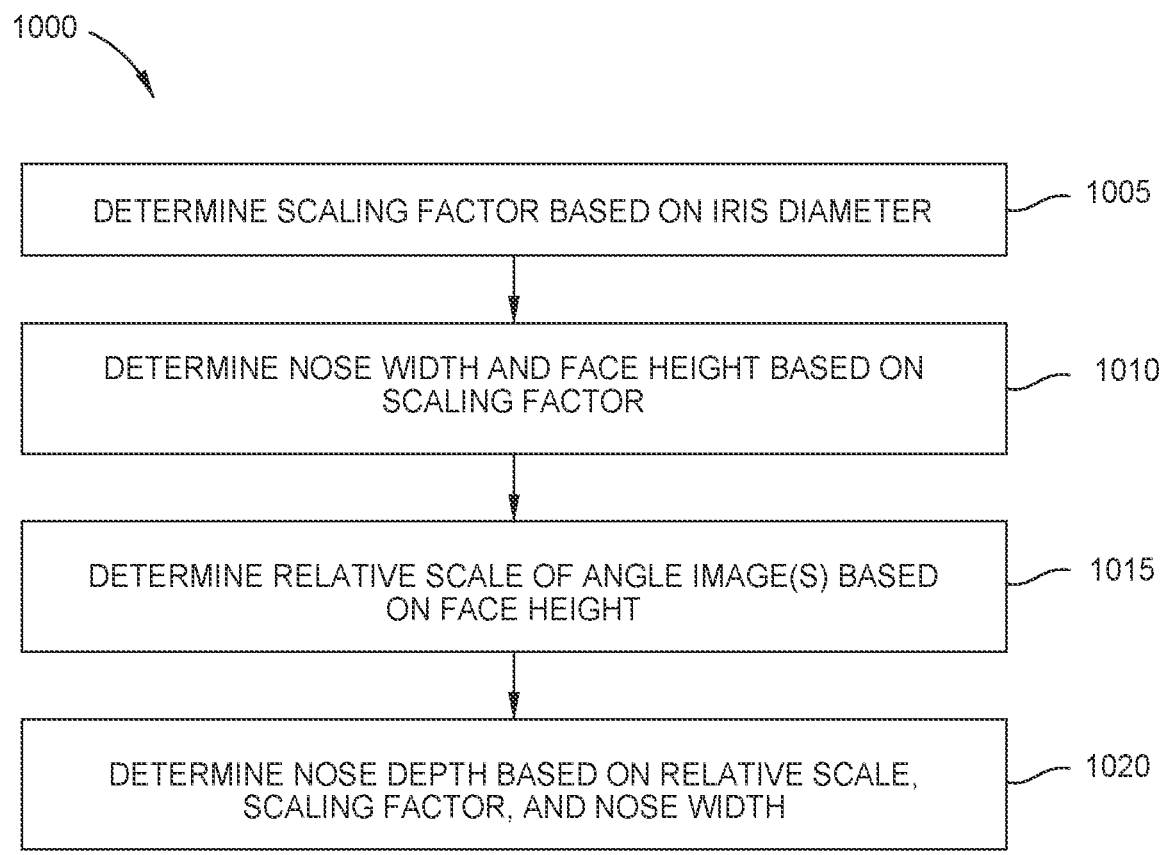
FIG. 10 depicts a flow diagram depicting an example method for determining biometric or anatomical measurements based on selected reference images.

FIG. 10 is a flow diagram depicting an example method 1000 for determining biometric or anatomical measurements based on selected reference images. In some embodiments, the biometric measurements correspond to facial landmark measurements. In some embodiments, the method 1000 is performed by a measurement system (e.g., the measurement system 105 of FIG. 1). In one embodiment, the method 1000 may provide additional detail for block 240 of FIG. 2, for the workflow 500 of FIG. 5, and/or for block 735 of FIG. 7.

The method 1000 begins at block 1005, where the measurement system determines a scaling factor for the frontal-facing image based at least in part on the diameter of the user's iris in the front-facing reference image, as discussed above. For example, based on the pixel-width of the iris in the image, as well as a predefined average iris diameter (e.g., in millimeters), the measurement system can determine the number of pixels-per-millimeter for the front-facing image.

At block 1010, the measurement system determines the nose width and face height for the user, based at least in part on the determined scaling factor and the front-facing reference image. For example, the measurement system may determine the facial height and nose width in terms of the number of pixels in the image. These pixel measurements can then be converted to absolute measurements (e.g., in millimeters) using the scaling factor.

At block 1015, the measurement system determines the relative scale of each angled reference image, as compared to the front-facing reference image, based at least in part on the face height in each. For example, as discussed above, the measurement system may compare the face height (in pixels) in the angled image(s) to the face height (in pixels) in the forward-facing image. The relative scale indicates how much measurements in the angled image need to be scaled (up or down) to ensure they correspond to the same absolute scale of the front-facing image. For example, if the face height in the angled image is slightly smaller than the face height in the front-facing image, the measurements in the angled image will be scaled up accordingly to compensate.

At block 1020, the measurement system can then determine the nose depth of the user, based on the relative scale (determined in block 1015), the scaling factor (determined in block 1005), and the nose width (determined in block 1010). In some embodiments, this determination is based further on the known angle of the user's face in the angled image, as discussed above.

Example Method for Use of Machine Learning to Select Facial Masks

Figure 11:
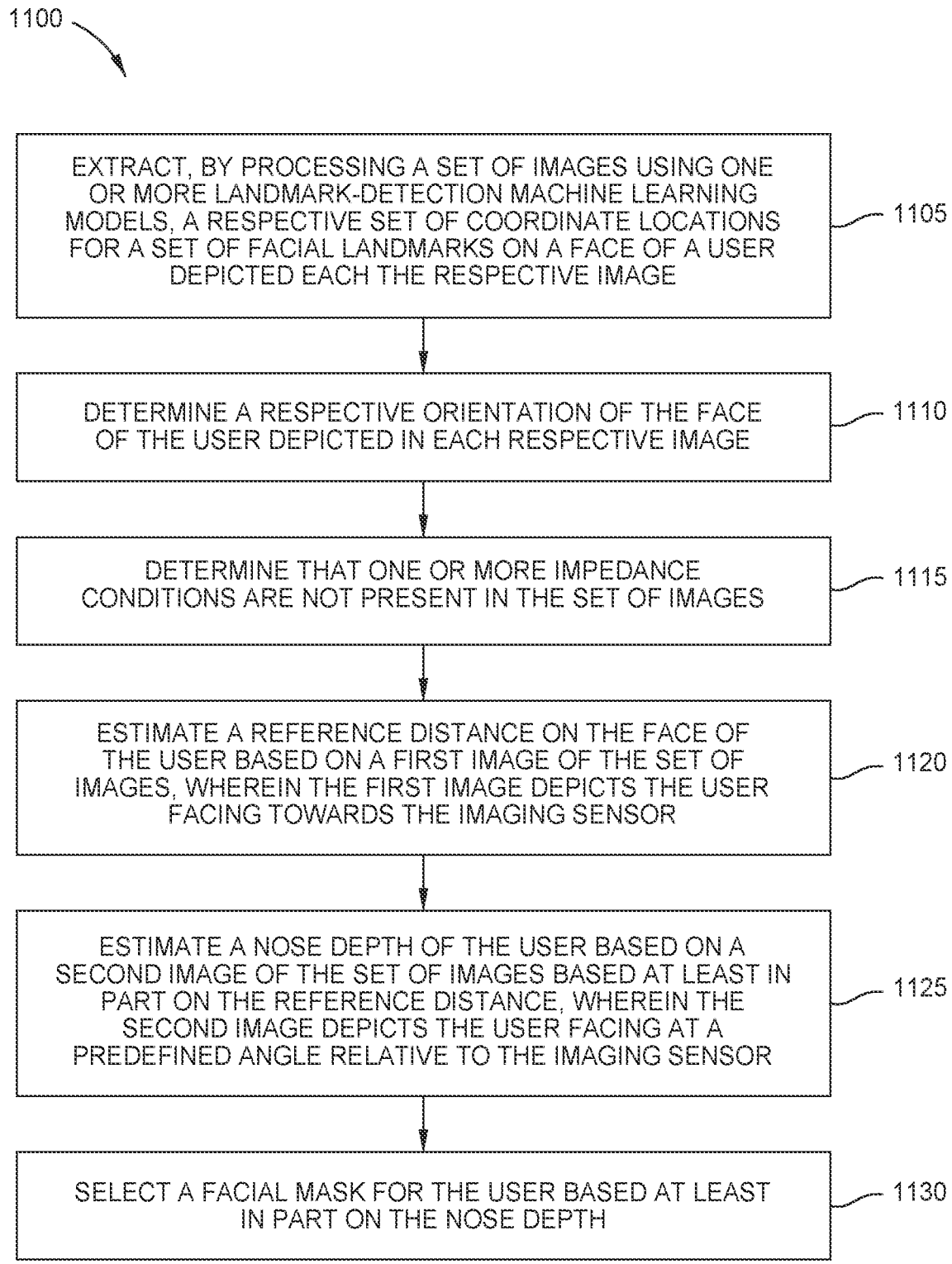
FIG. 11 depicts a flow diagram depicting an example method for using machine learning to determine facial measurements and select appropriate facial masks.

FIG. 11 is a flow diagram depicting an example method 1100 for using machine learning to select appropriate facial masks. In some embodiments, the method 1100 is performed by a measurement system (e.g., the measurement system 105 of FIG. 1).

At block 1105, a set of images are processed using one or more landmark-detection machine learning models to extract a respective set of coordinate locations for a set of facial landmarks on a face of a user depicted each the respective image.

In some embodiments, prior to identifying the set of images, it is determined, by processing at least one of the plurality of images using a glasses-detection machine learning model, that the user is not wearing glasses.

At block 1110, it is determined that a respective orientation of the face of the user depicted in each respective image.

At block 1115, it is determined that one or more impedance conditions are not present in the set of images.

In some embodiments, determining that the one or more impedance conditions are not present comprises determining, by processing each image of the set of images using a glasses-detection machine learning model, that the user is not wearing glasses in the set of images.

In some embodiments, determining that the one or more impedance conditions are not present comprises determining, based on the respective set of coordinate locations for each respective image of the set of images, that a mouth of the user is closed in the set of images.

In some embodiments, determining that the mouth of the user is closed in the set of images comprises, for the first image: determining a mouth width of the user in the first image based on the respective set of coordinate locations determining a mouth height of the user in the first image based on the respective set of coordinate locations, and determining that a ratio of mouth height to mouth width is above a defined threshold.

In some embodiments, determining that the one or more impedance conditions are not present comprises determining, based on the respective set of coordinate locations for the first image, that at least one eye of the user is open in the first image.

In some embodiments, determining that at least one eye of the user is open in the first image comprises: determining an eye width of the user in the first image based on the respective set of coordinate locations, determining an eye height of the user in the first image based on the respective set of coordinate locations, and determining that a ratio of eye height to eye width is below a defined threshold.

At block 1120, a reference distance on the face of the user is estimated based on a first image of the set of images, wherein the first image depicts the user facing towards the imaging sensor.

In some embodiments, estimating the reference distance comprises determining a width of an iris of the user by processing the first image using an iris-detection machine learning model.

In some embodiments, estimating the reference distance comprises determining a scaling factor based on the width of the iris, wherein the scaling factor indicates a number of pixels in the first image per millimeter on the face of the user.

At block 1125, a nose depth of the user is estimated based on a second image of the set of images based at least in part on the reference distance, wherein the second image depicts the user facing at a predefined angle relative to the imaging sensor.

In some embodiments, determining the nose depth of the user comprises: determining a relative scale for the second image based on a face height of the user depicted in the first image, and determining the nose depth based at least in part on the relative scale.

At block 1130, a facial mask is selected for the user based at least in part on the nose depth.

In some embodiments, the method 1100 further includes determining a nose width of the user depicted in the first image based at least in part on the reference distance, wherein selecting the facial mask is performed based further on the nose width.

In some embodiments, determining the nose depth comprises: determining a distance between a tip of a nose of the user and an alar-facial groove of the user based on the second image, and computing the nose depth based on the predefined angle in the second image, the nose width, and the distance between the tip of the nose and the alar-facial groove.

In some embodiments, the second image depicts the user facing at the predefined angle towards a first side of the imaging sensor, and the nose depth of the user is further determined based on a third image, from the set of images, wherein the third image depicts the user facing towards an opposite side of the imaging sensor, as compared to the second image.

In some embodiments, the set of images are from a plurality of images that are captured upon instructing the user to turn from side to side in front of the imaging sensor.

Example Method for Training Machine Learning Models to Detect Glasses

Figure 12:
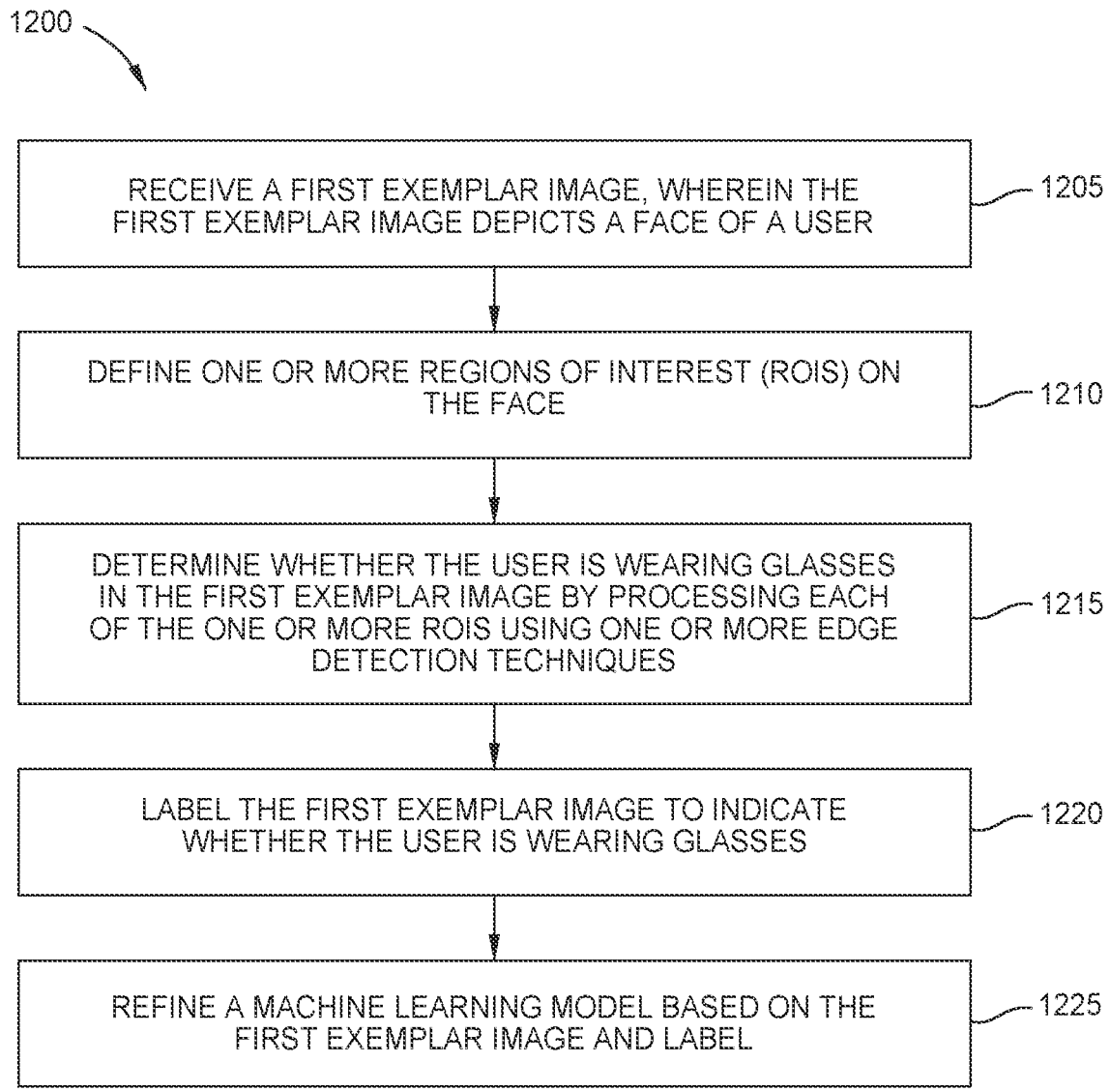
FIG. 12 depicts a flow diagram depicting an example method for training machine learning models to detect the presence of glasses in input images.

FIG. 12 is a flow diagram depicting an example method 1200 for training machine learning models to detect the presence of glasses in input images. In some embodiments, the method 1100 is performed by a training system associated with a healthcare provider.

At block 1205, a first exemplar image is received, wherein the first exemplar image depicts a face of a user.

At block 1210, one or more regions of interest (ROIs) are defined on the face.

In some embodiments, each respective ROI of the ROIs corresponds to a respective portion of the face where glasses, if present, may be visible.

At block 1215, each of the one or more ROIs are processed using one or more edge detection techniques to determine whether the user is wearing glasses in the first exemplar image.

In some embodiments, processing each of the one or more ROIs using one or more edge detection techniques comprises evaluating each respective ROI to determine whether a horizontal edge is present in the respective ROI.

At block 1220, the first exemplar image is labeled to indicate whether the user is wearing glasses.

At block 1225, a machine learning model is refined based on the first exemplar image and label.

In some embodiments, refining the machine learning model comprises: updating one or more parameters of an output layer of the machine learning model, and refraining from updating one or more parameters of at least a first hidden layer of the machine learning model, wherein the hidden layer is part of a pre-trained model.

In some embodiments, refining the machine learning model further comprises: updating one or more parameters of at least a second hidden layer of the machine learning model.

In some embodiments, the method 1200 further includes, upon determining that a number of exemplar images is below a defined threshold, augmenting the exemplar images by generating at least a second exemplar image based on the first exemplar image.

In some embodiments, generating the second exemplar image comprises at least one of: rotating the first exemplar image, mirroring the first exemplar image, or adding noise to the first exemplar image.

In some embodiments, the method 1200 further includes quantizing the machine learning model to reduce its size.

In some embodiments, the method 1200 further includes transmitting the machine learning model to a user device associated with a requesting user, wherein the user device uses the machine learning model to evaluate images of the requesting user.

In some embodiments, the user device uses the machine learning model to determine a facial height, nose width, and nose depth of the requesting user, and the user device transmits the facial height, nose width, and nose depth to one or more remote devices to facilitate selection of a facial mask for the requesting user.

Example Client-Server System for Determining Landmark Measurements

Figure 13:
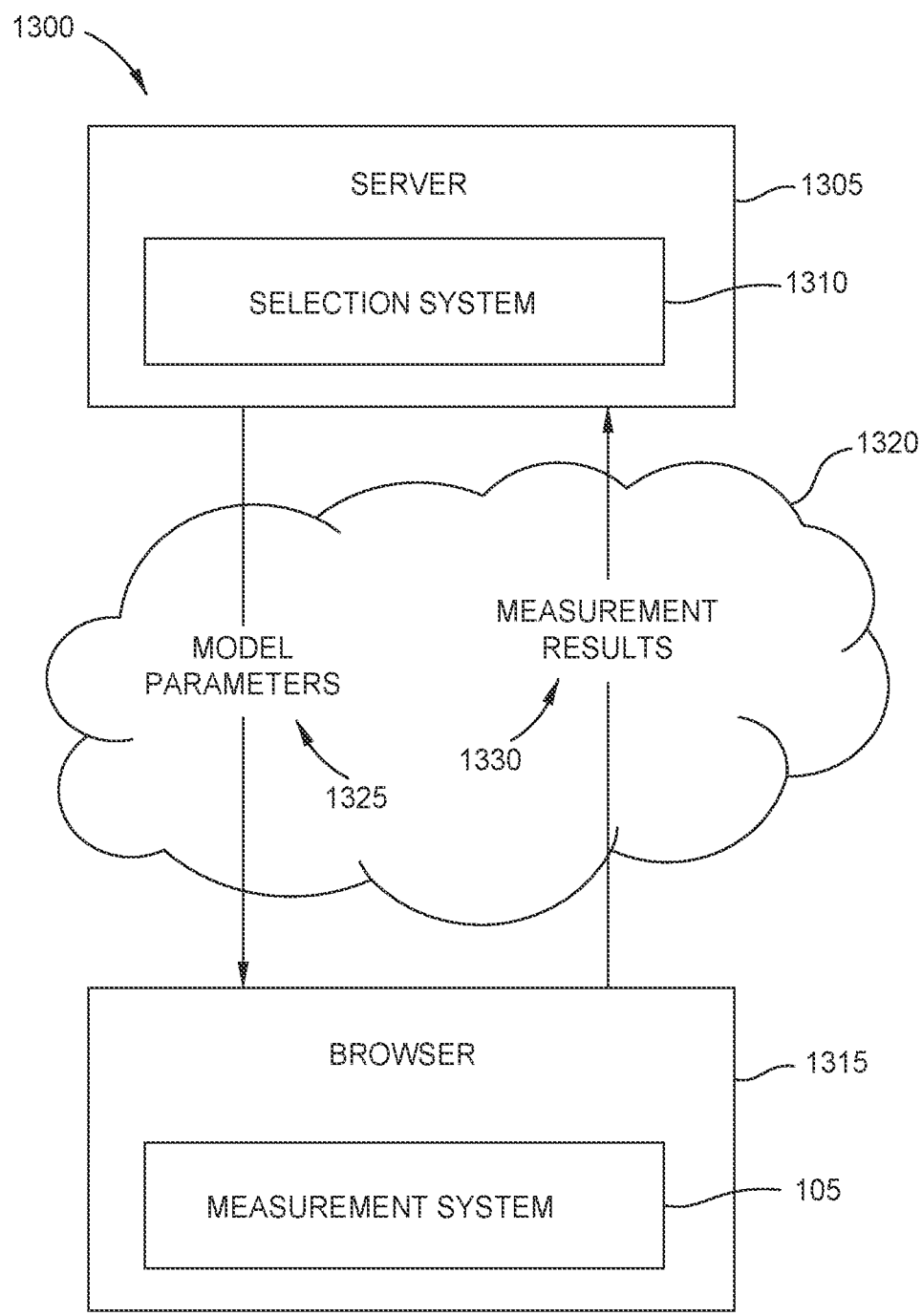
FIG. 13 depicts an example client-server system for determining landmark measurements on a client device.

FIG. 13 depicts an example client-server system 1300 for determining landmark measurements on a client device.

In the illustrated system 1300, a server 1305 is communicatively coupled with a browser 1315 via a network 1320. In at least one embodiment, the browser 1320 is a web browser that operates on a client device (e.g., a laptop or smartphone) of a user. In embodiments, the server 1305 may operate as a web server (e.g., in a cloud deployment, or hosted by a face mask provider) that provides the image analysis and facial mask selection or design, as disclosed herein. In at least one embodiment, the network 1320 is the Internet.

As illustrated, the server 1305 includes a selection system 1310, which may be implemented using hardware, software, or a combination of hardware and software. Generally, the selection system 1310 is configured to facilitate the generation of anatomical measurements (e.g., facial dimensions) for users based on captured images, and to use the measurements to drive selection, design, or fitment of devices such as facial masks.

In the illustrated example, the server 1305 (e.g., via the selection system 1310) transmits a set of model parameters 1325 to the browser 1315. In some embodiments, the model parameters 1325 are transmitted upon request from the browser 1315. For example, the user of the browser 1315 may navigate to an address associated with the selection system 1310, or otherwise indicate a desire to initiate automatic measurement for mask selection. In response, the server 1305 can transmit the model parameters 1325 (as well as associated instructions or software) to allow the browser 1315 to create the measurement system 105 locally. For example, the browser 1315 may instantiate, initiate, or otherwise create a set of machine learning models (e.g., a face detection model, landmark detection model, iris detection model, and the like) using the model parameters 1325. These models can then be used to evaluate and analyze images of the user, in order to generate the measurement results 1330.

As illustrated, the measurement results 1330 are then returned to the selection system 1310. The measurement results 1330 generally indicate the relevant anatomical measurements of the user. For example, for mask design or selection, the measurement results 1330 may indicate the facial height, nose width, nose depth, and the like.

In some embodiments, as discussed above, the actual images of the user are not transmitted to the server 1305, and are only processed locally to generate the measurement results 1330. In at least one embodiment, the measurement system 105 may transmit some or all of the user images to the server 1305. These images may be used to refine one or more of the models (e.g., the glasses detection model) in some embodiments.

In an embodiment, the selection system 1310 uses the measurement results 1330 to select, design, or otherwise facilitate procurement of one or more devices (e.g., facial masks) for the user. For example, in the case of pre-designed masks, the selection system 1310 may determine a predefined set of measurements (e.g., ranges for facial height, nose depth, and the like) for which each respective mask is designed. By determining which range(s) the measurement results 1330 match, the selection system 1310 can select the best-fitted mask for the user. As discussed above, although facial masks are used in some examples discussed herein, the selection system 1310 can generally be used to collect and evaluate a wide variety of anatomical measurements in various embodiments.

Although the illustrated example includes measurements being performed in a local browser 1315 and mask selection being performed remotely on a server 1305, in various embodiments, these processes may be performed in other locations. For example, both measurement and selection may be performed locally on the device, and may be performed on an application rather than in a browser. Similarly, in some aspects, image capture may occur on the client device, and these images may be sent to remote server for further processing.

Figure 14:
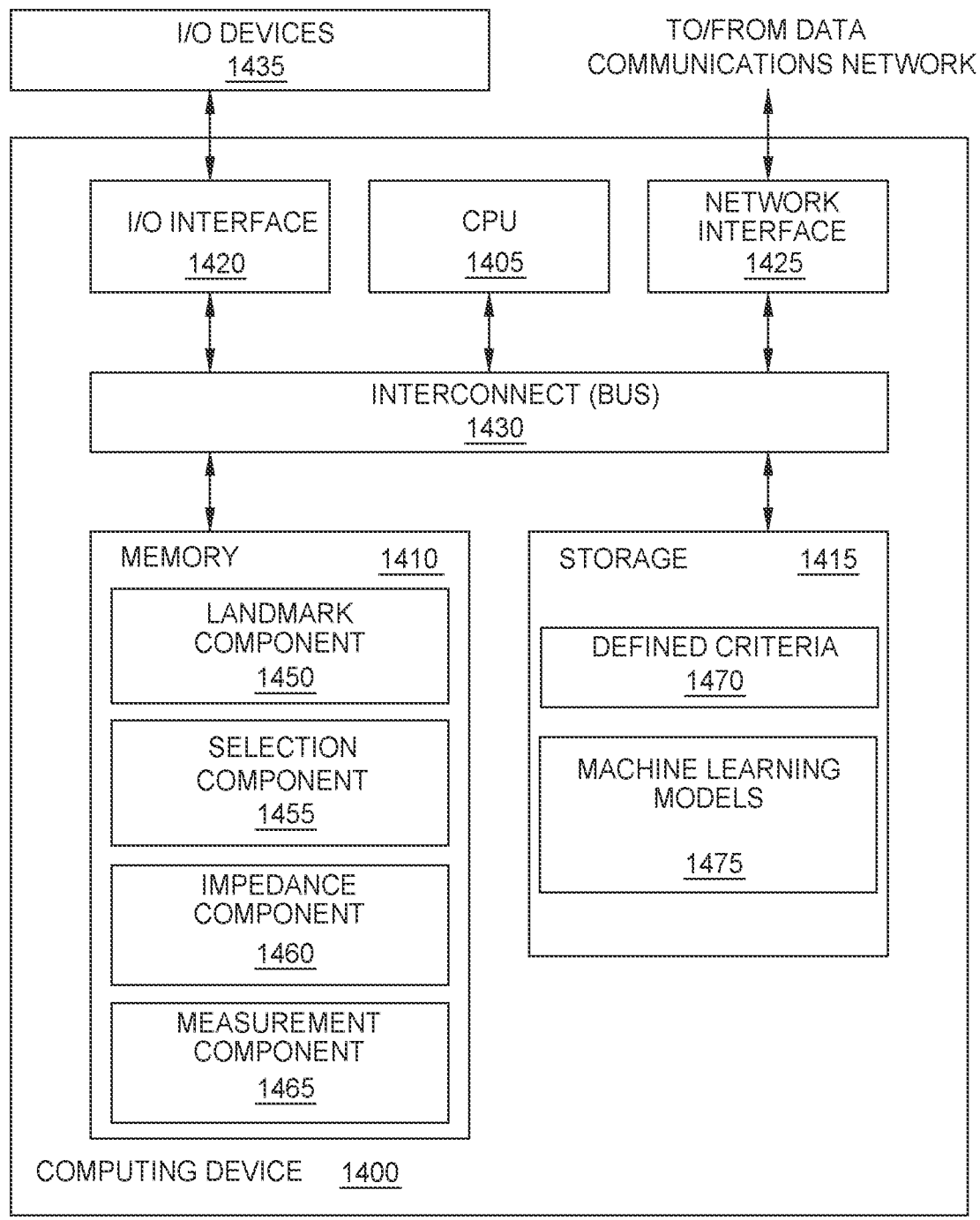
FIG. 14 depicts an example computing device configured to perform various aspects of the present disclosure.

Example Processing System for Use of Machine Learning to Determine Facial Measurements and Select Facial Masks FIG. 14 depicts an example computing device 1400 configured to perform various aspects of the present disclosure. Although depicted as a physical device, in embodiments, the computing device 1400 may be implemented using virtual device(s), and/or across a number of devices (e.g., in a cloud environment). In one embodiment, the computing device 1400 corresponds to the measurement system 105 of FIG. 1.

As illustrated, the computing device 1400 includes a CPU 1405, memory 1410, storage 1415, a network interface 1425, and one or more I/O interfaces 1420. In the illustrated embodiment, the CPU 1405 retrieves and executes programming instructions stored in memory 1410, as well as stores and retrieves application data residing in storage 1415. The CPU 1405 is generally representative of a single CPU and/or GPU, multiple CPUs and/or GPUs, a single CPU and/or GPU having multiple processing cores, and the like. The memory 1410 is generally included to be representative of a random access memory. Storage 1415 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 1435 (such as keyboards, monitors, etc.) are connected via the I/O interface(s) 1420. Further, via the network interface 1425, the computing device 1400 can be communicatively coupled with one or more other devices and components (e.g., via a network, which may include the Internet, local network(s), and the like). As illustrated, the CPU 1405, memory 1410, storage 1415, network interface(s) 1425, and I/O interface(s) 1420 are communicatively coupled by one or more buses 1430.

In the illustrated embodiment, the memory 1410 includes a landmark component 1450, a selection component 1455, an impedance component 1460, and a measurement component 1465, which may perform one or more embodiments discussed above. In some embodiments, the illustrated components execute within the browser on a user's device, as discussed above. Although depicted as discrete components for conceptual clarity, in embodiments, the operations of the depicted components (and others not illustrated) may be combined or distributed across any number of components. Further, although depicted as software residing in memory 1410, in embodiments, the operations of the depicted components (and others not illustrated) may be implemented using hardware, software, or a combination of hardware and software.

For example, the landmark component 1450 may generally be used to identify and extract facial landmarks from user images (e.g., using landmark detection models, iris detection models, and the like). The selection component 1455 is generally configured to identify and select appropriate reference images based on these landmarks, and a set of defined reference orientations. The impedance component 1460 may be configured to detect the presence of any defined impedances in the reference images, as discussed above. The measurement component 1465 may generally be used to compute the facial measurements, such as facial height, nose width and depth, and the like, based on the reference images.

In the illustrated example, the storage 1415 includes defined criteria 1470 and machine learning models 1475. Although depicted as residing in storage 1415, the defined criteria 1470 and machine learning models 1475 may be stored in any suitable location, including memory 1410. Generally, the defined criteria 1470 includes any predefined values or thresholds used in the measurement process, such as the fixed iris width or diameter, reference orientations, mouth and/or eye ratios for impedance detection, and the like. The machine learning models 1475 generally include the relevant trained models, such as the glasses detection model, landmark detection model, iris detection model, and the like.

In some embodiments, the illustrated components (e.g., the landmark component 1450, selection component 1455, impedance component 1460, and measurement component 1465) as well as the relevant data and models (e.g., the defined criteria 1470 and machine learning models 1475) are provided to the user upon request (e.g., from a provider system). That is, when the user requests to perform automated facial scanning, the provider system may transmit the defined criteria 1470 and machine learning models 1475, along with software configured to execute the above-discussed workflows and methods. For example, the workflows and methods may be implemented in a browser on the user device (e.g., using JavaScript).

Example Clauses

Clause 1: A method, comprising: identifying a set of images, from a plurality of images captured by an imaging sensor, that satisfy defined orientation criteria, comprising, for each respective image in the set of images: extracting, by processing the respective image using one or more landmark-detection machine learning models, a respective set of coordinate locations for a set of facial landmarks on a face of a user depicted in the respective image; and determining a respective orientation of the face of the user depicted in the respective image; determining that one or more impedance conditions are not present in the set of images; estimating a reference distance on the face of the user based on a first image of the set of images, wherein the first image depicts the user facing towards the imaging sensor; estimating a nose depth of the user based on a second image of the set of images based at least in part on the reference distance, wherein the second image depicts the user facing at a predefined angle relative to the imaging sensor; and selecting a facial mask for the user based at least in part on the nose depth.

Clause 2: The method of Clause 1, wherein determining that the one or more impedance conditions are not present comprises: determining, by processing each image of the set of images using a glasses-detection machine learning model, that the user is not wearing glasses in the set of images.

Clause 3: The method of any one of Clauses 1-2, further comprising: prior to identifying the set of images, determining, by processing at least one of the plurality of images using the glasses-detection machine learning model, that the user is not wearing glasses.

Clause 4: The method of any one of Clauses 1-3, wherein determining that the one or more impedance conditions are not present comprises: determining, based on the respective set of coordinate locations for each respective image of the set of images, that a mouth of the user is closed in the set of images.

Clause 5: The method of any one of Clauses 1-4, wherein determining that the mouth of the user is closed in the set of images comprises, for the first image: determining a mouth width of the user in the first image based on the respective set of coordinate locations; determining a mouth height of the user in the first image based on the respective set of coordinate locations; and determining that a ratio of mouth height to mouth width is above a defined threshold.

Clause 6: The method of any one of Clauses 1-5, wherein determining that the one or more impedance conditions are not present comprises: determining, based on the respective set of coordinate locations for the first image, that at least one eye of the user is open in the first image.

Clause 7: The method of any one of Clauses 1-6, wherein determining that at least one eye of the user is open in the first image comprises: determining an eye width of the user in the first image based on the respective set of coordinate locations; determining an eye height of the user in the first image based on the respective set of coordinate locations; and determining that a ratio of eye height to eye width is below a defined threshold.

Clause 8: The method of any one of Clauses 1-7, wherein estimating the reference distance comprises determining a width of an iris of the user by processing the first image using an iris-detection machine learning model.

Clause 9: The method of any one of Clauses 1-8, wherein estimating the reference distance comprises: determining a scaling factor based on the width of the iris, wherein the scaling factor indicates a number of pixels in the first image per millimeter on the face of the user.

Clause 10: The method of any one of Clauses 1-9, wherein determining the nose depth of the user comprises: determining a relative scale for the second image based on a face height of the user depicted in the first image; and determining the nose depth based at least in part on the relative scale.

Clause 11: The method of any one of Clauses 1-10, further comprising determining a nose width of the user depicted in the first image based at least in part on the reference distance, wherein selecting the facial mask is performed based further on the nose width.

Clause 12: The method of any one of Clauses 1-11, wherein determining the nose depth comprises: determining a distance between a tip of a nose of the user and an alar-facial groove of the user based on the second image; and computing the nose depth based on the predefined angle in the second image, the nose width, and the distance between the tip of the nose and the alar-facial groove.

Clause 13: The method of any one of Clauses 1-12, wherein: the second image depicts the user facing at the predefined angle towards a first side of the imaging sensor, and the nose depth of the user is further determined based on a third image, from the set of images, wherein the third image depicts the user facing towards an opposite side of the imaging sensor, as compared to the second image.

Clause 14: The method of any one of Clauses 1-13, wherein the plurality of images are captured upon instructing the user to turn from side to side in front of the imaging sensor.

Clause 15: A method, comprising: receiving a first exemplar image, wherein the first exemplar image depicts a face of a user; defining one or more regions of interest (ROIs) on the face; determining whether the user is wearing glasses in the first exemplar image by processing each of the one or more ROIs using one or more edge detection techniques; labeling the first exemplar image to indicate whether the user is wearing glasses; and refining a machine learning model based on the first exemplar image and label.

Clause 16: The method of Clause 15, wherein each respective ROI of the ROIs corresponds to a respective portion of the face where glasses, if present, may be visible.

Clause 17: The method of any one of Clauses 15-16, wherein processing each of the one or more ROIs using one or more edge detection techniques comprises evaluating each respective ROI to determine whether a horizontal edge is present in the respective ROI.

Clause 18: The method of any one of Clauses 15-17, further comprising: upon determining that a number of exemplar images is below a defined threshold, augmenting the exemplar images by generating at least a second exemplar image based on the first exemplar image.

Clause 19: The method of any one of Clauses 15-18, wherein generating the second exemplar image comprises at least one of: rotating the first exemplar image; mirroring the first exemplar image; or adding noise to the first exemplar image.

Clause 20: The method of any one of Clauses 15-19, wherein refining the machine learning model comprises: updating one or more parameters of an output layer of the machine learning model; and refraining from updating one or more parameters of at least a first hidden layer of the machine learning model, wherein the hidden layer is part of a pre-trained model.

Clause 21: The method of any one of Clauses 15-20, wherein refining the machine learning model further comprises: updating one or more parameters of at least a second hidden layer of the machine learning model.

Clause 22: The method of any one of Clauses 15-21, further comprising quantizing the machine learning model to reduce its size.

Clause 23: The method of any one of Clauses 15-22, further comprising transmitting the machine learning model to a user device associated with a requesting user, wherein the user device uses the machine learning model to evaluate images of the requesting user.

Clause 24: The method of any one of Clauses 15-23, wherein: the user device uses the machine learning model to determine a facial height, nose width, and nose depth of the requesting user; and the user device transmits the facial height, nose width, and nose depth to one or more remote devices to facilitate selection of a facial mask for the requesting user.

Clause 25: A system, comprising: a memory comprising computer-executable instructions; and one or more processors configured to execute the computer-executable instructions and cause the processing system to perform a method in accordance with any one of Clauses 1-24.

Clause 26: A system, comprising means for performing a method in accordance with any one of Clauses 1-24.

Clause 27: A non-transitory computer-readable medium comprising computer-executable instructions that, when executed by one or more processors of a processing system, cause the processing system to perform a method in accordance with any one of Clauses 1-24.

Clause 28: A computer program product embodied on a computer-readable storage medium comprising code for performing a method in accordance with any one of Clauses 1-24.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., elopement analyzer 205) or related data available in the cloud. For example, the elopement analyzer 205 could execute on a computing system in the cloud and generate elopement likelihoods. In such a case, the elopement analyzer 205 could generate scores and selectively enable or disable sensors, and store the models, sensor data, and/or extrinsic data at a storage location in the cloud. Doing so allows a user to access this information from any computing system attached to a network connected to the cloud (e.g., the Internet).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    identifying a set of images, from a plurality of images captured by an imaging sensor, that satisfy defined orientation criteria, comprising, for each respective image in the set of images:
        extracting, by processing the respective image using one or more landmark-detection machine learning models, a respective set of coordinate locations for a set of facial landmarks on a face of a user depicted in the respective image; and
        determining a respective orientation of the face of the user depicted in the respective image based on the respective set of coordinate locations for the set of facial landmarks, wherein at least one image of the plurality of images is discarded for failing to satisfy the defined orientation criteria;
    determining that one or more impedance conditions are not present in the set of images;
    estimating a reference distance on the face of the user based on a first image of the set of images, wherein the first image depicts the user facing towards the imaging sensor and the reference distance indicates an absolute measurement of at least one of the set of facial landmarks;
    estimating a nose depth of the user based on a second image of the set of images based at least in part on the reference distance, wherein the second image depicts the user facing at a predefined angle relative to the imaging sensor; and
    selecting a facial mask for the user based at least in part on the nose depth.

2. The method of claim 1, wherein determining that the one or more impedance conditions are not present comprises:

determining, by processing each image of the set of images using a glasses-detection machine learning model, that the user is not wearing glasses in the set of images; and prior to identifying the set of images, determining, by processing at least one of the plurality of images using the glasses-detection machine learning model, that the user is not wearing glasses.

3. The method of claim 1, wherein determining that the one or more impedance conditions are not present comprises:

determining, based on the respective set of coordinate locations for each respective image of the set of images, that a mouth of the user is closed in the set of images.

4. The method of claim 3, wherein determining that the mouth of the user is closed in the set of images comprises, for the first image:

determining a mouth width of the user in the first image based on the respective set of coordinate locations;

determining a mouth height of the user in the first image based on the respective set of coordinate locations; and determining that a ratio of mouth height to mouth width is above a defined threshold.

5. The method of claim 1, wherein determining that the one or more impedance conditions are not present comprises:

determining, based on the respective set of coordinate locations for the first image, that at least one eye of the user is open in the first image.

6. The method of claim 5, wherein determining that at least one eye of the user is open in the first image comprises:

determining an eye width of the user in the first image based on the respective set of coordinate locations;

determining an eye height of the user in the first image based on the respective set of coordinate locations; and determining that a ratio of eye height to eye width is below a defined threshold.

7. The method of claim 1, wherein:

estimating the reference distance comprises determining a width of an iris of the user by processing the first image using an iris-detection machine learning model, estimating the reference distance comprises determining a scaling factor based on the width of the iris, and the scaling factor indicates a number of pixels in the first image per millimeter on the face of the user.

8. The method of claim 1, wherein determining the nose depth of the user comprises:

determining a relative scale for the second image based on a face height of the user depicted in the first image; and determining the nose depth based at least in part on the relative scale.

9. The method of claim 1, further comprising determining a nose width of the user depicted in the first image based at least in part on the reference distance, wherein selecting the facial mask is performed based further on the nose width, and wherein determining the nose depth comprises:

determining a distance between a tip of a nose of the user and an alar-facial groove of the user based on the second image; and computing the nose depth based on the predefined angle in the second image, the nose width, and the distance between the tip of the nose and the alar-facial groove.

10. The method of claim 9, wherein:

the second image depicts the user facing at the predefined angle towards a first side of the imaging sensor, and the nose depth of the user is further determined based on a third image, from the set of images, wherein the third image depicts the user facing towards an opposite side of the imaging sensor, as compared to the second image.

11. A system, comprising:

a memory comprising computer-executable instructions; and one or more processors configured to execute the computer-executable instructions and cause the system to perform an operation comprising:

identifying a set of images, from a plurality of images captured by an imaging sensor, that satisfy defined orientation criteria, comprising, for each respective image in the set of images:

extracting, by processing the respective image using one or more landmark-detection machine learning models, a respective set of coordinate locations for a set of facial landmarks on a face of a user depicted in the respective image; and determining a respective orientation of the face of the user depicted in the respective image based on the respective set of coordinate locations for the set of facial landmarks, wherein at least one image of the plurality of images is discarded for failing to satisfy the defined orientation criteria;

determining that one or more impedance conditions are not present in the set of images;

estimating a reference distance on the face of the user based on a first image of the set of images, wherein the first image depicts the user facing towards the imaging sensor and the reference distance indicates an absolute measurement of at least one of the set of facial landmarks;

estimating a nose depth of the user based on a second image of the set of images based at least in part on the reference distance, wherein the second image depicts the user facing at a predefined angle relative to the imaging sensor; and selecting a facial mask for the user based at least in part on the nose depth.

* * * * *